(12) United States Patent
Dax

(10) Patent No.: US 11,480,962 B1
(45) Date of Patent: Oct. 25, 2022

(54) DYNAMIC LANE EXPANSION

(71) Applicant: Zoox, Inc., Foster City, CA (US)

(72) Inventor: Victoria Magdalena Dax, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 370 days.

(21) Appl. No.: 16/457,197

(22) Filed: Jun. 28, 2019

(51) Int. Cl.
 *G05D 1/02* (2020.01)
 *G05D 1/00* (2006.01)
 *G06V 20/56* (2022.01)

(52) U.S. Cl.
 CPC ......... *G05D 1/0088* (2013.01); *G05D 1/0214* (2013.01); *G06V 20/588* (2022.01); *G05D 2201/0213* (2013.01)

(58) Field of Classification Search
 CPC ......... B60W 30/18163; B62D 15/0255; B62D 15/0265; G05D 1/0088; G05D 1/0214; G05D 2201/0213; G06K 9/00798
 See application file for complete search history.

(56) References Cited

U.S. PATENT DOCUMENTS

| | | | |
|---|---|---|---|
| 8,712,624 B1 | 4/2014 | Ferguson et al. | |
| 10,146,223 B1 | 12/2018 | Luders et al. | |
| 10,369,990 B2 * | 8/2019 | Gussner | B60W 30/0956 |
| 10,931,374 B1 | 2/2021 | Sleator | |
| 11,132,211 B1 | 9/2021 | Tang | |
| 2002/0036584 A1 | 3/2002 | Jocoy et al. | |
| 2007/0035416 A1 | 2/2007 | Tanaka et al. | |
| 2008/0012726 A1 | 1/2008 | Publicover | |
| 2010/0106356 A1 | 4/2010 | Trepagnier et al. | |
| 2012/0083959 A1 | 4/2012 | Dolgov et al. | |
| 2015/0175159 A1 * | 6/2015 | Gussner | B60W 10/18 701/1 |
| 2015/0348418 A1 * | 12/2015 | Pfeiffer | B60W 50/14 340/435 |

(Continued)

FOREIGN PATENT DOCUMENTS

| | | |
|---|---|---|
| EP | 3185233 A1 | 6/2017 |
| WO | WO2013186620 A1 | 12/2013 |

(Continued)

OTHER PUBLICATIONS

Non Final Office Action dated Nov. 3, 2020 for U.S. Appl. No. 16/295,935, "State Machine for Traversing Junctions", Gier, 12 pages.

(Continued)

*Primary Examiner* — Frederick M Brushaber
*Assistant Examiner* — Matthew J. Reda
(74) *Attorney, Agent, or Firm* — Lee & Hayes, P.C.

(57) ABSTRACT

A vehicle can determine a drivable region of an environment and determine an expansion region to expand the drivable region. Candidate regions can be identified in the environment and portions of the candidate regions which may be used for planning can be determined. The width of such a portion can meet or exceed a threshold and an expansion region can be determined. The expansion region can be associated with the drivable region to determine an expanded drivable region. The vehicle can traverse the environment based on the expanded drivable region to avoid, for example, an object in the environment while maintaining a safe distance the object and/or other entities in the environment.

20 Claims, 8 Drawing Sheets

(56) References Cited

U.S. PATENT DOCUMENTS

| | | |
|---|---|---|
| 2016/0075332 A1 | 3/2016 | Edo-Ros |
| 2016/0161270 A1 | 6/2016 | Okumura |
| 2016/0318490 A1* | 11/2016 | Ben Shalom .............. B60T 7/18 |
| 2017/0057514 A1 | 3/2017 | Toyoda et al. |
| 2017/0113665 A1 | 4/2017 | Mudalige et al. |
| 2017/0113683 A1 | 4/2017 | Mudalige et al. |
| 2017/0132934 A1 | 5/2017 | Kentley et al. |
| 2017/0193384 A1 | 7/2017 | Mudalige et al. |
| 2017/0262709 A1 | 9/2017 | Wellington et al. |
| 2017/0368691 A1 | 12/2017 | Li |
| 2018/0004215 A1 | 1/2018 | Miller et al. |
| 2018/0074502 A1 | 3/2018 | Holben |
| 2018/0137762 A1 | 5/2018 | Lee et al. |
| 2018/0259957 A1* | 9/2018 | Charrow .............. G05D 1/0214 |
| 2018/0284285 A1 | 10/2018 | Curatu |
| 2018/0370528 A1 | 12/2018 | Rittger et al. |
| 2018/0373257 A1 | 12/2018 | Runde et al. |
| 2019/0009782 A1 | 1/2019 | Kanzawa |
| 2019/0043353 A1 | 2/2019 | Kim et al. |
| 2019/0079523 A1 | 3/2019 | Zhu et al. |
| 2019/0088148 A1 | 3/2019 | Jacobus et al. |
| 2019/0220016 A1 | 7/2019 | Phillips et al. |
| 2019/0235499 A1 | 8/2019 | Kazemi et al. |
| 2019/0347821 A1 | 11/2019 | Stein |
| 2019/0354779 A1* | 11/2019 | Zhao ..................... G06T 7/70 |
| 2019/0384294 A1 | 12/2019 | Shashua et al. |
| 2019/0384304 A1 | 12/2019 | Towal et al. |
| 2020/0012286 A1* | 1/2020 | Delp ..................... G06V 20/588 |
| 2020/0019802 A1 | 1/2020 | Krishnan |
| 2020/0070826 A1* | 3/2020 | Watanabe .............. G08G 1/166 |
| 2020/0180612 A1 | 6/2020 | Finelt et al. |
| 2020/0257317 A1 | 8/2020 | Musk et al. |
| 2020/0285244 A1 | 9/2020 | Gier et al. |
| 2020/0346662 A1* | 11/2020 | Suzuki .............. G01C 21/3407 |
| 2020/0364472 A1 | 11/2020 | Liu et al. |
| 2020/0409386 A1 | 12/2020 | Thakur et al. |
| 2021/0004613 A1 | 1/2021 | Yang et al. |
| 2021/0016777 A1 | 1/2021 | Weiser |
| 2021/0108926 A1 | 4/2021 | Tran |
| 2021/0129834 A1 | 5/2021 | Gier et al. |
| 2021/0133466 A1 | 5/2021 | Gier et al. |

FOREIGN PATENT DOCUMENTS

| | | |
|---|---|---|
| WO | WO2016094088 A1 | 6/2016 |
| WO | WO2016094224 A1 | 6/2016 |
| WO | WO2019093190 A1 | 5/2019 |

OTHER PUBLICATIONS

The PCT Search Report and Written Opinion dated Jun. 9, 2020 for PCT Application No. PCT/US2020/020821, 12 pages.

The PCT Search Report and Written Opinion dated Feb. 1, 2021 for PCT Application No. PCT/US20/57336, 13 pages.

Campbell et al., "Autonomous Driving in Urban Environments: Approaches, Lessons and Challenges," Philosophical Transaction of the Royal Society, Philosophical Transactions, Oct. 2010, pp. 4649-4672.

General Motors, 2018 Self-Driving Safety Report, 2018, pp. 1-33.

Levinson et al., "Towards Fully Autonomous Driving: Systems and Algorithms," 2011 IEEE Intelligent Vehicles Symposium(IV), Baden-Baden, Germany, Jun. 5-9, 2011, pp. 163-168.

Office Action for U.S. Appl. No. 16/671,012, dated Feb. 25, 2022, Gier, "State Machine for Obstacle Avoidance", 7 pages.

Office Action for U.S. Appl. No. 16/671,012, dated May 31, 2022, Gier, State Machine for Obstacle Avoidance, 8 pages.

The International Preliminary Report on Patentability for PCT Application No. PCT/US20/57336, dated May 12, 2022, 8 pages.

* cited by examiner

DYNAMIC LANE EXPANSION

BACKGROUND

An autonomous vehicle can use various methods, apparatuses, and systems to guide the autonomous vehicle through an environment. For example, an autonomous vehicle can use planning methods, apparatuses, and systems to determine a drive path and guide the autonomous vehicle through the environment that contains dynamic objects (e.g., vehicles, pedestrians, animals, and the like) and static object (e.g., buildings, signage, stalled vehicles, and the like). In some instances, dynamic and/or static objects can act as obstacles that block or slow the autonomous vehicle as it traverses the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
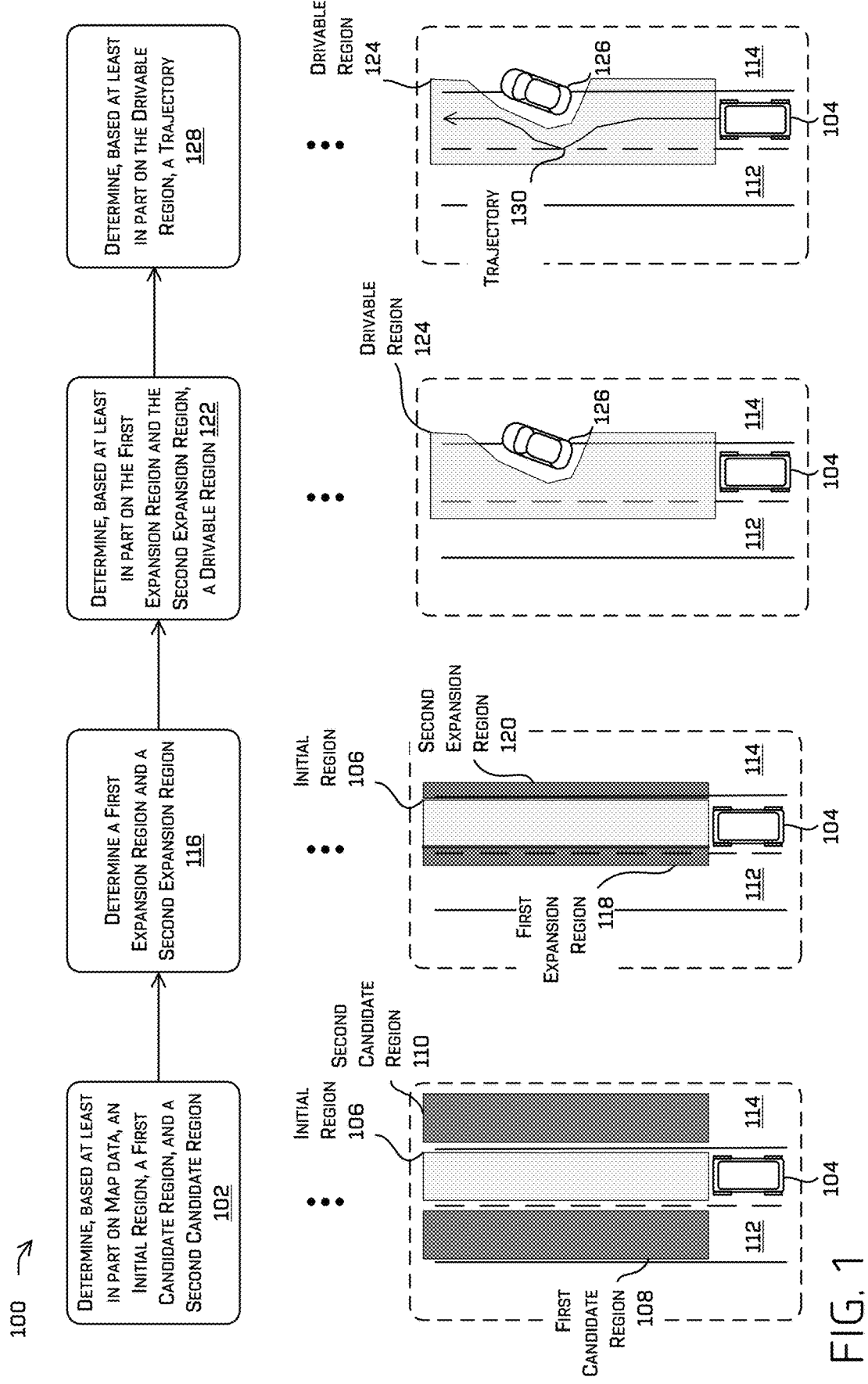
FIG. 1 illustrates a pictorial flow diagram of an example process for determining a drivable region and a trajectory to traverse through the drivable region.

This disclosure describes systems, methods, and apparatuses for determining an expanded drivable region (also referred to as an expanded region or an expanded traversable region) in which a vehicle can travel in an environment. A drivable region can be a virtual representation in the environment that can define the constraints and/or boundaries within which a vehicle can safely travel relative to the objects to effectively reach an intended destination. In some instances, an initial drivable region (also referred to as an initial region) can be predetermined and/or defined by a map for use in a vehicle (e.g., an autonomous vehicle). In some examples, the initial region is determined by a computing device on an autonomous vehicle and/or by a computing device on a remote computing system, and can be used by the vehicle to traverse the environment. That is, the computing device onboard the autonomous vehicle can determine trajectories and/or drive paths based on the extents (also referred to as a width) of the initial region. In some instances, the extent of the initial region can be expanded to include an expansion region to generate an expanded drivable region (also referred to as a second drivable region or an expanded region). For example, the computing device can determine a candidate region that can be adjacent to the initial region. In some instances, the computing device can determine a type and/or a classification associated with the candidate region. Based on a width and type/classification of a candidate region, the computing device can determine an expansion region to determine the expanded region.

In some instances, the objects in the environment can affect an extent of a drivable region within the expanded region. For example, the extent of a drivable region can be determined by considering dynamic objects (e.g., pedestrians, animals, cyclists, trucks, motorcycles, other vehicles, and the like), and static objects (e.g., buildings, signage, curbs, road markings, physical lane boundaries, road imperfections and the like), and/or other objects, which can be known or unknown, in an environment of a vehicle and/or the predicted actions of those objects. As a non-limiting example, a vehicle in an adjacent lane may partially obstruct travel in an autonomous vehicle's current lane. Due to the partial obstruction, the autonomous vehicle would otherwise have to change lanes (if an alternate lane is available) and/or remain confined to the current position, two options which are either costly computationally or temporally. In such an example, however, utilizing the expanded region can allow the autonomous vehicle to, for example, circumvent or surpass obstacles at a lower cost (or more efficiently) compared to, for example, the lane change action and continue its mission.

For example, the computing device of the autonomous vehicle can, via a map database, access map data associated with the environment. The autonomous vehicle can be configured to use the map data to determine the initial region, the candidate regions, and/or the classifications.

By way of example and without limitation, an autonomous vehicle can, based on the map data, determine that the autonomous vehicle is traversing on an initial region (or first drivable region) associated with a first driving lane and determine a candidate region (or second drivable region) associated with a second driving lane that is adjacent to the first driving lane. In some instances, the autonomous vehicle can use the map data to determine a classification (also referred to as a region type) of the candidate region. For example, the classification can include a traffic/driving lane, a bicycle lane, a parking lane, a pedestrian lane, a crosswalk, a bus lane, a taxi lane, a high-occupancy vehicle (HOV) lane, a motorcycle lane, a shoulder, a stopping lane, a turn lane, a streetcar lane and the like.

In some instances, the computing device of the autonomous vehicle can use the sensor data associated with an environment to determine one or more additional candidate regions adjacent or near the initial region. In some instances, the autonomous vehicle can use a combination of the sensor data and the map data to determine the initial region, the candidate region(s), and/or the classifications. As discussed in further detail below, the computing device of the autonomous vehicle can, based at least in part on one or more candidate regions, determine the expanded region (e.g., the expanded drivable region).

In some instances, once the expanded region is established, the computing device of the autonomous vehicle can determine a trajectory for proceeding within the expanded region. For example, the expanded region can define boundaries of a region in which the vehicle can travel, and the trajectories can be discrete segments within the expanded region according to which the vehicle will travel. Thus, for example, while the expanded region can be calculated using a planned or predicted path through the environment, the trajectories can be discrete, shorter segments intended to be carried out by the vehicle to traverse through the environment, within the expanded region. Examples of techniques for determining trajectories within drivable regions can be found, for example, in U.S. patent application Ser. No. 15/982,694 titled "Drive Envelope Determination" and filed May 17, 2018, which is hereby incorporated by reference, in its entirety.

In some instances, a computing device of an autonomous vehicle can receive sensor data and determine one or more objects in an environment and/or attributes of the one or more objects in the environment. In some instances, the autonomous vehicle can use the one or more objects and/or the one or more attributes of the one or more objects to determine contours or boundaries of a drivable region within the expanded region.

In some instances, a reference trajectory representing an initial path or trajectory for the autonomous vehicle to follow can be generated or received by the computing device of the autonomous vehicle. In some examples, the reference trajectory can correspond to a centerline of a road segment, although the reference trajectory can represent any path in an environment.

In some instances, a target trajectory can be generated with respect to the reference trajectory by evaluating one or more costs associated with points on the reference trajectory. In general, the one or more costs can include, but is not limited to a reference cost, an obstacle cost, a lateral cost, a longitudinal cost, and the like. For example, as boundaries of a drivable region are determined (e.g., using the techniques discussed herein), such costs can vary, which can ultimately change a location of an autonomous vehicle in an environment. In an example where an initial region is expanded that provides an expanded region around an obstacle in an environment, the autonomous vehicle can plan a trajectory based on costs determined in part on the expanded region.

In some instances, a reference cost can include a cost associated with a difference between a point on the reference trajectory and a corresponding point on the target trajectory, whereby the difference represents one or more difference in a yaw, lateral offset, velocity, acceleration, curvature, curvature rate, and the like. Such costs may be used to ensure that the determined trajectory stays as close the reference trajectory as possible (e.g., an L2 penalization on lateral distances between a trajectory and a reference trajectory or line).

In some instances, an obstacle cost can comprise a cost associated with a distance between a point on the reference trajectory or the target trajectory and a point associated with an obstacle in the environment. For example, a point associated with an object can correspond to a point on a boundary of a drivable region or can correspond to a point associated with the object in the environment. As discussed above, an object in the environment can include, but is not limited to a static object (e.g., building, curb, sidewalk, lane marking, sign post, traffic light, tree, etc.) or a dynamic object (e.g., a vehicle, bicyclist, pedestrian, animal, etc.). In some instances, a dynamic object can also be referred to as an agent. In some examples, a static object or a dynamic object can be referred to generally as an object or an obstacle. Such a cost may be used to ensure that the determined trajectory is sufficiently far from objects in an environment. As such, such costs may be altered based on the classification of object, as well as inversely proportional to the distance to the object (closer being associated with higher costs).

In some instances, a lateral cost can refer to a cost associated with steering inputs to the vehicle, such as maximum steering inputs relative to a velocity of the vehicle. In some instances, a longitudinal cost can refer to a cost associated with a velocity and/or acceleration of the vehicle (e.g., maximum braking and/or acceleration). Such costs may be used to ensure that the vehicle is operating within feasible limits and/or comfort limits for passengers being ferried.

As discussed above, the vehicle can determine a drivable region that represents a region in the environment where the vehicle can travel. Examples of techniques for determining a drive envelope can be found, for example, in U.S. patent application Ser. No. 15/982,694 titled "Drive Envelope Determination" and filed May 17, 2018 (describing, in part, determining a drivable region (also referred to as a driving envelope) for traversing an environment), which is hereby incorporated by reference, in its entirety.

In some examples, such a drivable region may correspond to individual actions for the autonomous vehicle to perform. Examples of actions may include but are not limited to "stay in lane," "merge right," "merge left," "lane change," "follow vehicle," "traverse around double parked vehicle," and the like. For example, a first drivable region can correspond to a "stay in lane" action, while a second drivable region can correspond to a "lane change" action. In some examples, a planning system can select a particular action for an autonomous vehicle to perform based at least in part on cost(s) associated with that action. In some examples, by determining an updated drivable region in accordance with the techniques discussed herein, a planning system can determine a first cost for a trajectory associated with the updated drivable region, which may be lower than a second cost associated with a lane change action and/or lower than a third cost associated with a trajectory not using the updated drivable region. Thus, an action can be selected or determined based on costs associated with each action. Examples of determining costs associated with actions can be found, for example, in U.S. patent application Ser. No. 15/843,512 titled "Trajectory Generation Using Curvature Segments" and filed Dec. 14, 2018, which is hereby incorporated by reference, in its entirety.

In some instances, a computing device of an autonomous vehicle can receive sensor data captured by one or more sensors of the autonomous vehicle and can determine one or more objects in the environment and/or attributes of the one or more objects in the environment. In some instances, the autonomous vehicle can use the one or more objects and/or the attributes of the one or more objects to determine which of the one or more objects should be included in determining extents of the drivable region. Accordingly, the autonomous vehicle can plan a trajectory (e.g., a reference trajectory and/or the target trajectory) within the extents of the drivable region.

As discussed above, once a drivable an initial region is established, the computing device of the autonomous vehicle can determine a trajectory for proceeding within the initial region. In some instances, as the vehicle proceeds within the initial region, an object (e.g., a stalled vehicle, debris, and the like) can affect an extent of a portion of the initial region. In some instances, the portion of the initial region affected by the object can prevent the vehicle from proceeding through the initial region (such as when there are no other lanes in which the autonomous vehicle can traverse to overcome the obstacle). As discussed above, a computing device of the vehicle can consider various costs (e.g., a reference cost, an obstacle cost, lateral costs, etc.) and determine that the vehicle cannot proceed and/or that the vehicle will incur a significant cost in order to proceed.

By way of example and without limitation, an autonomous vehicle can approach a stalled or otherwise stationary vehicle that affects an extent of a portion of the initial region determined by the autonomous vehicle. In some instances, an adjacent driving lane can be a driving lane with a direction of travel that is the same as the initial region. Therefore, the autonomous vehicle can perform a lane change action to circumvent the stalled or stationary vehicle. However, a lane change action can incur costs to perform the action. For example, a planner system can associate some costs with a lane change action to encourage a vehicle to stay in a lane. Generating an expanded region can allow the autonomous vehicle to circumvent the stalled or stationary vehicle without perform an action such as a lane change action while still making progress to a waypoint or goal.

In some instances, the computing device of the autonomous vehicle can identify one or more candidate regions that are near and/or adjacent to the initial region. By way of example and without limitation, a candidate region can be an adjacent (e.g., to the left and/or right of the initial region) driving lane (whether oncoming or in the same direction of traffic), a bicycling lane, a parking lane, a crosswalk, a shoulder, a bus lane, and the like. Then, a width associated with the candidate region (also referred to as the candidate width) can be determined. The width of the candidate region can inform a width of the expansion region that can be used to expand the initial region, as discussed herein.

By way of example and without limitation, the autonomous vehicle can identify a candidate region that is a driving lane. The autonomous vehicle can determine that the width of the candidate region as 3 meters and determine that the threshold width for a driving lane is 2.5 meters (which, at least in some instances, may include a safety buffer). Therefore, the expansion region can be 0.5 meters (e.g., 3 m−2.5 m=0.5 m) allowing the autonomous vehicle to expand the initial region by 0.5 meters while continuing to allow other vehicles to safely occupy and use the driving lane associated with the candidate region.

By way of further example and without limitation, the autonomous vehicle can identify a candidate region that corresponds to a bicycle lane. The autonomous vehicle can determine the width of the candidate region as 1.6 meters and determine that the threshold width for a bicycle lane corresponds to 1 meter (which may include a safety margin that may be the same as or differ from the safety margin above). Therefore, in such an example, the expansion region can be 0.6 meters in the case of a bicycle lane as the candidate region allowing the autonomous vehicle to expand the initial region by up to 0.6 meters while continuing to allow bicyclists to safely occupy and use the bicycle lane in the candidate region.

In some instances, a width of the expansion region can be based at least in part on an expansion threshold width. Returning to the bicycle lane example above, a difference between the width of the candidate region (e.g., 1.6 m) and the threshold width (e.g., 1.0 m) is 0.6 meters. However, in some instances, an expansion threshold width can be used to limit an amount a vehicle can encroach on another region. In some examples, an expansion threshold width can correspond to 0.5 meters. In some examples, the expansion threshold width can be based on a variety of factors, as discussed herein. For example, the expansion threshold width can be based on a direction of travel associated with the candidate region. By way of example and without limitation, the autonomous vehicle can determine a first expansion threshold width that is 0.5 meters that is associated with a first adjacent lane that has a same direction of travel as the direction of travel of a current lane of the autonomous vehicle and determine a second expansion threshold width that is 0.2 meters that is associated with a second adjacent lane that has a different direction of travel. Thus, in the bicycle lane example discussed above, the autonomous vehicle can determine that a width of a candidate region is 1.6 meters and that the threshold width is 1.0 meters, resulting in an available expansion region of 0.6 meters. The expansion threshold width can indicate that the expansion region is to be less than or equal to the expansion threshold width. Therefore, an expansion threshold width of 0.5 meters can result in an expansion region of 0.5 meters despite the available expansion region of 0.6 meters.

The techniques described herein are directed to leveraging sensor and perception data to enable a vehicle, such as an autonomous vehicle, to navigate through an environment while circumventing objects in the environment using expanded regions. Techniques described herein can determine an expanded region within which a vehicle can travel relative to those objects in a safe and efficient manner. In some examples, determining an expanded region can avoid a lane change to traverse around obstacles in an environment, which can result in a smoother ride and can improve safety outcomes by, for example, more accurately determining a safe region in which the vehicle can operate to reach an intended destination.

FIG. 1 is a pictorial flow diagram showing an example process 100 to determine a drivable region and a trajectory to traverse through the drivable region.

At operation 102, a vehicle 104 can traverse along an initial region 106 and determine a first candidate region 108 and a second candidate region 110 based at least in part on map data. For example, the vehicle 104 can access map data that indicates candidate drivable regions of an environment. The candidate drivable regions can include driving lane (e.g., traffic lanes) and bus lanes. In some instances, the candidate drivable regions can include bicycle lanes, crosswalks, shoulders, motorcycle lanes, and the like.

In some instances, the vehicle 104 can use the map data to determine a classification (also referred to as a region type) of the first candidate region 108 and the second candidate region 110. For example, the classification can include a traffic/driving lane, a bicycle lane, a parking lane, a pedestrian lane, a crosswalk, a bus lane, a taxi lane, a high-occupancy vehicle (HOV) lane, a motorcycle lane, a shoulder, a stopping lane, and the like. By way of example and without limitation, the first candidate region 108 can be associated with a driving lane 112 and the second candidate region 110 can be associated with a parking lane 114 that are adjacent to the initial drivable region 106. Therefore, the first candidate region 108 can be associated with a driving lane classification and the second candidate region 110 can be associated with a parking lane classification.

At operation 116, the vehicle 104 can determine a first expansion region 118 associated with the first candidate region 108 and a second expansion region 120 associated with the second candidate region 110. The vehicle 104 can determine the first expansion region 118 and the second expansion region 120 based at least in part on an expansion threshold width. For example, an expansion threshold width can indicate a threshold width by which to expand the initial region 106. By way of example and without limitation, an expansion threshold width can be 0.5 meters and that can allow the vehicle 104 to expand the initial region 106 by 0.5 meters into the first candidate region 108 and the second candidate region 110 to determine the first expansion region 118 and the second expansion region 120.

At operation 122, the vehicle 104 can determine a drivable region 124 based at least in part on the first expansion region 118 and the second expansion region 120. For example, the vehicle 104 can expand the initial region 106 to include the first expansion region 118 and the second expansion region 120 to determine an expanded region. Additionally, the vehicle 104 can capture sensor data and detect object 126 based on the sensor data. As discussed above, the extent of a drivable region can be determined by considering dynamic objects (e.g., pedestrians, animals, cyclists, trucks, motorcycles, other vehicles, and the like), and static objects (e.g., buildings, signage, curbs, road markings, physical lane boundaries, road imperfections and the like), and/or other objects, which can be known or unknown, in an environment of a vehicle and/or the predicted actions of those objects. Therefore, the vehicle 104 can determine a drivable region 124 where an extent of a portion of the drivable region is affected by the object 126 partially obstructing the driving lane of vehicle 104.

At operation 128, the vehicle 104 can determine a trajectory 130 to traverse through the drivable region 124 while circumventing object 126. By way of example and without limitation, due to the partial obstruction of the object 126, the vehicle 104 would otherwise have had to change lanes and/or remain confined to the current driving lane until the obstruction cleared. However, determining a drivable region using the techniques described herein can allow the vehicle 104 to circumvent the object 126 without performing a more costly action (e.g., a lane change action or a waiting action).

Figure 2A:
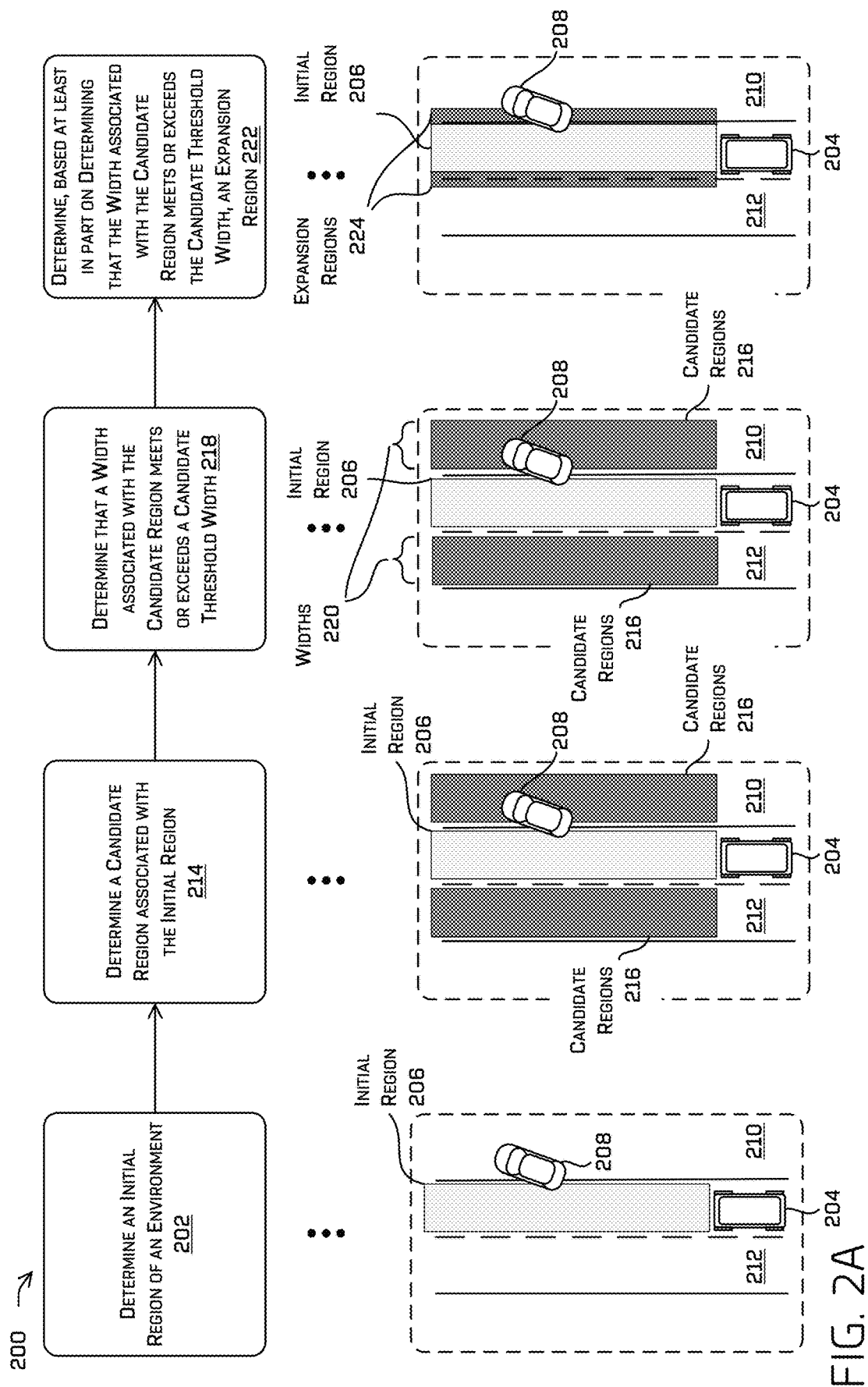
FIG. 2A illustrates a pictorial flow diagram of an example process for determining an expansion region based on a candidate region threshold width.

FIG. 2A is a pictorial flow diagram showing of an example processes 200 to determine one or more expansion regions.

At operation 202, a vehicle 204 can determine an initial region 206 that is associated with an environment. The operation 202 can include the accessing map data to determine a lane in which the vehicle can drive. In some examples, the operation 202 can include determining the initial region 206 based at least in part on the map data and/or sensor data. In some instances, the vehicle 204 can capture sensor data of an environment, which can include other objects such as the object 208.

By way of example, without limitation, the object 208 can represent a vehicle that is parked in parking lane 210, whereby a portion of the object 208 protrudes into a lane occupied by the vehicle 204. In some examples, the object 208 may not be physically located within a lane associated with the vehicle, although a region around the object 208 can be defined so as to limit a width of a drivable region. FIG. 2A illustrates the object 208 impinging on the initial region 206. Accordingly, the initial region 206 can be associated with a lane of the environment that is not associated with the object 208.

Although the object 208 is illustrated as a parked vehicle, other types of objects are contemplated such as slow moving vehicles and/or objects of a type that is different from the classification of the region (e.g., a bicyclist on a driving lane, a pedestrian on a bus lane, etc.), construction debris, etc. However, as depicted in FIG. 2A and discussed above, the object 208 can be parked in a manner such that a portion of the object 208 impinges on a portion of the initial region 206.

FIG. 2A further illustrates a traffic lane 212 to the left of initial region 206. In some instances, the traffic lane 212 can be a lane associated with a same direction of travel as the initial region 206. In some instances, the traffic lane 212 can be a lane associated with a same or a different direction of travel as initial region 206.

The vehicle 204 can use sensor data to determine that object 208 is in a location that is in front of the vehicle 204. In some instances, the vehicle 204 can be similar to the vehicle 104 described above with respect to FIG. 1. Additionally, the vehicle 204 can use sensor data and/or map data to determine that the object 208 is in a position that corresponds to a lane occupied by the vehicle 204 as well as the parking lane 210. By way of example and without limitation, the vehicle 204 can use a perception engine and/or localization algorithms to determine a position of the object 208 and associate the position of the object 208 with a portion of the map data that can include road/lane data associated with the environment to determine that a region occupied by the object 208 as well as an effect on the initial region 206.

At operation 214, the vehicle 204 can determine candidate regions 216. The candidate regions 216 can be associated with the traffic lane 212 that, as discussed above, can be a lane associated with a same or a different direction of travel as initial region 206 as well as the parking lane 210. As depicted in FIG. 2, and by way of example and without limitation, the vehicle 204 determines candidate regions 216 that is in the traffic lane 212 and a candidate regions 216 in the parking lane 210 that is broken (e.g., separated) because a candidate region in the parking lane 210 at a region associated with the object 208 would not be a drivable region due to the object 208. In some instances, the candidate regions 216 can be determined by the vehicle 204 prior to accounting for objects in the environment such as object 208.

At operation 218, the vehicle 204 can determine widths 220 associated with the candidate regions 216. The widths 220 can indicate the drivable portions that are associated with the candidate regions 216. In some instances, the vehicle 204 can use sensor data to determine the widths 220. In some instances, the vehicle 204 can use map data to determine the widths 220. In some instances, the vehicle 204 can determine widths associated with individual candidate regions. By way of example and without limitation, the vehicle 204 can determine a width associated with a candidate region that is to the left of the vehicle 204 and determine a separate width that is associated with a candidate region that is to the right of the vehicle 204. In some instances, the vehicle 204 can determine an additional width that is associated with a candidate region that is in front of the vehicle 204 as the contour of the traffic lane 212 changes. Additionally, at operation 218, the vehicle 204 can compare the widths 220 to a candidate threshold width. Such a comparison may ensure, in at least some examples, that there is sufficient space to engage the drivable surface for traversal. By way of example, the vehicle 204 can determine widths 220 as 3 meters, although the widths 220 can correspond to any width associated with an environment. As discussed above, the vehicle 204 can determine the widths 220 using sensor data, map data, or a combination of the sensor data and the map data.

Additionally, the vehicle 204 can determine a classification (also referred to as a region type) associated with the candidate regions 216. For example, a traffic lane such as traffic lane 212 can be associated with a driving lane classification and a bicycle lane can be associated with a bicycle lane classification. Additional examples include, associating a crosswalk with a crosswalk (or a pedestrian lane) classification, associating a bus lane with a bus lane classification, and associating a motorcycle lane with a motorcycle lane classification. The classification can indicate a candidate threshold width. In some cases, a candidate threshold width associated with a driving lane classification can be 2.5 meters and a candidate threshold width associated with a bicycle lane classification can be 1.5 meters, although a candidate threshold can comprise any width, depending on an implementation.

The candidate threshold width can be based at least in part on a width that can allow a type of object to continue to use of the candidate regions 216 if the vehicle 204 expands the initial region 206 into the candidate regions 216. For example, a candidate region that is associated with a driving lane classification can be associated with a candidate threshold width of 2.5 meters. The candidate threshold width can be based on an average width of the types of objects that typically occupy the candidate region, although other techniques for determining the candidate threshold width are contemplated. In some cases, an average width of passenger vehicles can be 2.5 meters and, thus, a candidate region that is associated with a driving lane classification can be associated with a candidate threshold width of 2.5 meters, although such a candidate threshold can vary based on a particular implementation. Additionally, and by way of example, for an implementation whereby buses can have an average width of 3.0 meters, such a candidate region that is associated with a bus lane classification can be associated with a candidate threshold width of 3.0 meters.

Thus, the vehicle 204 can use the candidate threshold width to determine if a type of object associated with the candidate region (e.g., a car, a bus, a bicycle, etc.) can continue to use the candidate region if the vehicle 204 expands the initial region 206 into the candidate regions 216. Additionally, the vehicle 204 can determine an amount that remains beyond the candidate threshold width within the candidate regions 216. By way of example, in an environment whereby the candidate regions 216 can be associated with candidate threshold width of 2.5 meters and a width can be determined to be 3.0 meters, a remaining amount can correspond to 0.5 meters (e.g., 3.0 m−2.5 m=0.5 m). In some instances, the remaining amount can be distributed between the initial region 206 and the candidate regions 148. By way of example and without limitation, a remaining amount can be 0.5 m and a first portion of the remaining amount (e.g., 0.20 m) can be reserved for the candidate regions 148 with a second portion of the remaining amount (e.g., 0.3 m) can be reserved for expansion.

At operation 222, the vehicle 204 can determine, based at least in part on determining that the width associated with the candidate region meets or exceeds the candidate threshold width, expansion regions 224. In an example where the amount can correspond to a width of 0.5 meters, the vehicle can determine that the expansion regions 224 can consume the entirety of the amount. Therefore, the vehicle 204 can expand the initial region 206 to include the expansion regions 156 of 0.5 meters. In some instances, the vehicle 204 can use an expansion threshold width to determine the expansion regions 224. By way of example and without limitation, the expansion threshold width can be a value of 0.3 meters and the available amount can be 0.5 meters. In such circumstances, the vehicle 204 would determine an expansion regions 224 with a width of 0.3 meters. Of course, the expansion threshold width can be any value depending on an implementation and/or on other conditions of an environment, as discussed herein.

In some instances, limiting the width of the expansion regions 224 can assist a planning system of the vehicle as determining expansion regions 224 too far can cause a planning system to determine trajectories that use the expansion regions 224 as a current driving lane rather than the initial region 206 as the current driving lane. Further, limiting a width of the expansion regions 224 can prevent the vehicle 204 from occupying too much of an adjacent lane or region. By way of example and without limitation, an initial region 206 can have a width of 1.5 meters and expansion regions 224 can have a width of 2.5 meters. If the vehicle 204 uses the expansion regions 224 to circumvent an object, a majority of the vehicle 204 can occupy the expansion regions 224 which can, in some instances, can result in the vehicle 204 using some or all of the expansion regions 224 as the current driving lane rather than the initial region 206 prior to expansion.

In some instances, the expansion threshold width can be based on the width of the initial region 206. For example, the expansion threshold width can indicate a percentage such that if the initial region 206 has a width of 3.0 meters, the expansion threshold width can indicate a percentage of 10% which can result in an expansion threshold width of 0.3 meters.

In some instances, the widths 220 can be less than the candidate threshold width. In such circumstances, the vehicle would not use the candidate regions 216 to determine expansion regions 224.

After expanding the initial region 206 to include the expansion regions 224, the vehicle 204 can circumvent the object 208 by traversing along a trajectory based at least in part on a drivable region that includes the expansion regions 224 without executing, for example, a lane change action.

Figure 2B:
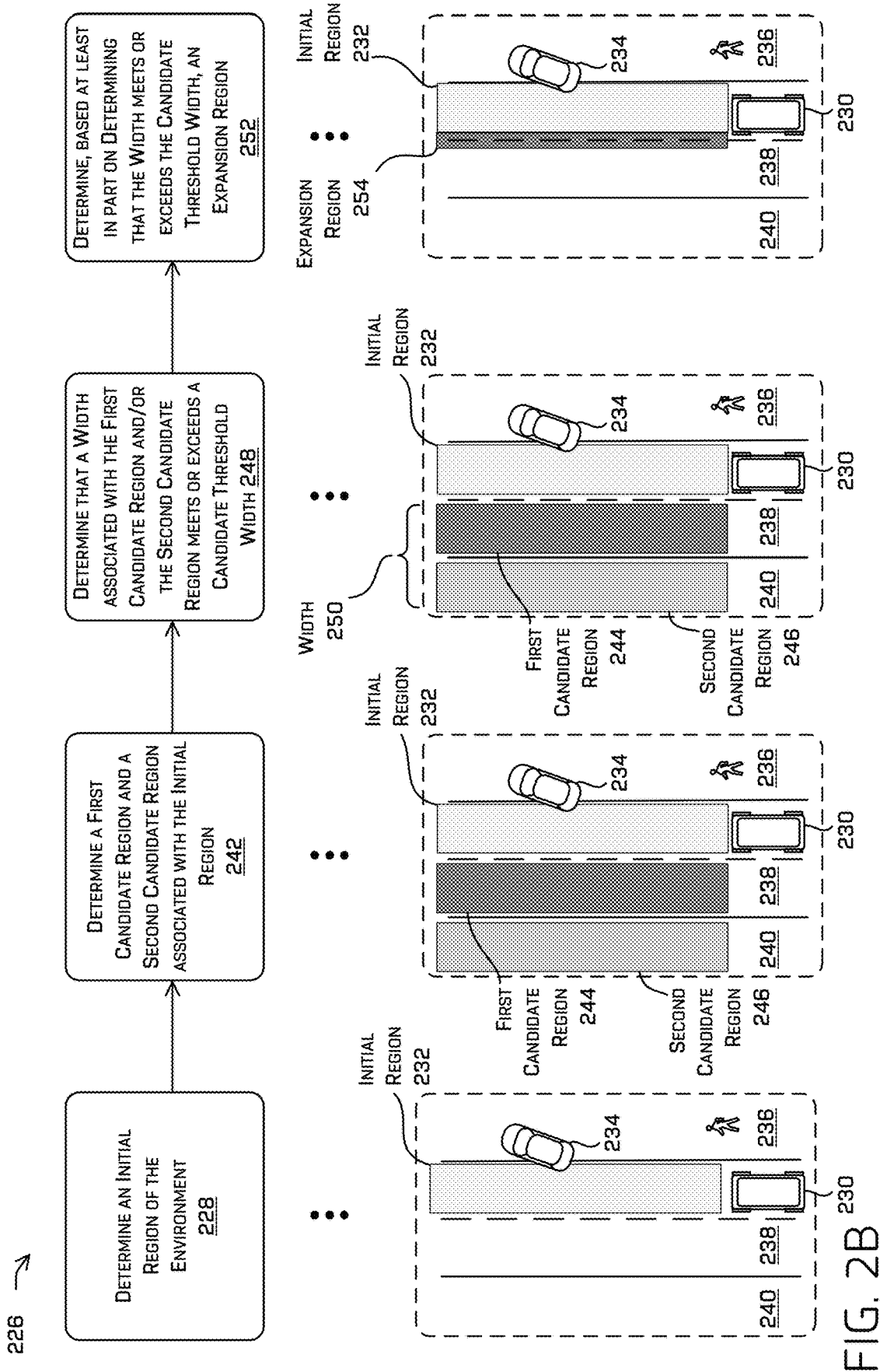
FIG. 2B illustrates a pictorial flow diagram of an example process for determining an expansion region based on a first candidate region and a second candidate region.

FIG. 2B is a pictorial flow diagram showing an example process 226 to determine an expansion region using multiple candidate regions.

At operation 228, the vehicle 230 can determine the initial region 232 that is associated with an environment. In some instances, the vehicle 230 can be similar to the vehicle 104 and vehicle 204 described above with respect to FIGS. 1 and 2A. In front of vehicle 230 can be an object 234. By way of example and without limitation, the object 234 can be a vehicle that is stalled partially in the initial region 232 and partially on a sidewalk 236. However, as depicted in FIG. 2, the object 234 can be position in a manner such that a portion of the object 234 affects a portion of the initial region 232. To the left of initial region 232 can be a traffic lane 238. In some instances, the traffic lane 238 can be a lane associated with a same direction of travel as the initial region 232. In some instances, the traffic lane 238 can be a lane associated with a different direction of travel as the initial region 232. To the left of the traffic lane 238 can be a parking lane 240.

The vehicle 230 can use sensor data to determine that object 234 is in a location that is in front of the vehicle 230. Additionally, the vehicle 230 can use sensor data and/or map data to determine that the object 234 is in a position that is partially in the driving lane of the vehicle 230 as well as partially in the sidewalk 236. By way of example and without limitation, the vehicle 230 can use a perception engine and/or localization algorithms to determine a position of the object 234 and associate the position of the object 234 with a portion of the map data that can include road/lane data associated with the environment to determine that a portion of the object 234 is partially in the driving lane of the vehicle 230 (that can cause a deformation of a portion of the drivable region) and partially in the sidewalk 236.

At operation 242, the vehicle 230 can determine a first candidate region 244 and a second candidate region 246. The first candidate region 244 can be associated with the traffic lane 238 that, as discussed above, can be a lane associated with a same or a different direction of travel as the initial region 232. In some instances, the vehicle 230 can determine the first candidate region 244 that is associated with the traffic lane 238 and the second candidate region 246 that is associated with the parking lane 240, as depicted in FIG. 2. In some instances, the sidewalk 236 can be a drivable region and the vehicle can determine a different and/or an additional candidate region that is associated with the sidewalk 236. However, as depicted in FIG. 2, the sidewalk 236, by way of example and without limitation, is not a drivable region and is therefore not a candidate region. As depicted in FIG. 2, the vehicle 230 can determine the first candidate region 244 that is in the traffic lane 238 based on the map data and/or the sensor data.

At operation 248, the vehicle 230 can determine a width 250 associated with the first candidate region 244 and/or the second candidate region 246. The width 250 can indicate the candidate drivable region that is associated with the first candidate region 244 and/or the second candidate region 246. As discussed above, in some instances, the vehicle 230 can use sensor data and/or map data to determine the width 250. In general, in some examples, a width of an expansion can be greater in the event that a second candidate region is associated with a first candidate region.

Additionally, the vehicle can determine a first classification associated with the first candidate region 244 and a second classification associated with the second candidate region 246. In some cases, classification information can be encoded into map data and associated with a location in an environment. In some cases, the vehicle can determine a classification based on sensor data (or a combination of map data and/or sensor data). For example, a traffic lane such as traffic lane 238 can be associated with a driving lane classification and a parking lane such as parking lane 240 can be associated with a parking lane classification. As discussed above, the classification can indicate a candidate threshold width.

The vehicle 230 can use the candidate threshold width to determine if a type of object associated with the first candidate region 244 can continue to use the first candidate region 244 if the vehicle 230 expands the initial region 232 into the first candidate region 244. Additionally, the vehicle can use the candidate threshold width to determine if a type of object associated with the second candidate region 246 can continue to use the second candidate region 246 if the vehicle 230 expands the initial region 232 into the first candidate region 244 and/or if an object traversing along the traffic lane 238 expands a drivable region associated with the object into the parking lane 240.

As discussed above, the vehicle 230 can determine an amount that remains beyond the candidate threshold width within the first candidate region 244 and/or the second candidate region 246.

By way of example and without limitation, the vehicle 230 can determine that a width associated with the first candidate region 244 is 2.5 meters and a width associated with the second candidate region 246 is 3.5 meters. Additionally, the vehicle can determine a first candidate threshold width associated with the first candidate region 244 that is 2.5 meters and a second candidate threshold width associated with the second candidate region 246 that is 2.5 meters. Then the vehicle can determine a first amount that remains beyond the first candidate threshold width within the first candidate region 244. In this example, the first candidate region 244 is associated with a width of 2.5 meters and the first candidate threshold width can be 2.5 which results in an amount of 0 meters. Therefore, in such a circumstance, the vehicle 230 would not be able to expand the initial region 232 into the first candidate region 244. However, the vehicle 230 can determine a second amount that remains beyond the second candidate threshold width within the second candidate region 246. In this example, the second candidate region 246 is associated with a width of 3.5 meters and the second candidate threshold width can be 2.5 meters which results in an amount of 1.0 meter. Therefore, an amount of 1.0 meter remains. At operation 252, the vehicle 230 can determine, based at least in part on determining that the width meets or exceeds the candidate threshold width, an expansion region 254.

Thus, in some instances, the vehicle can determine that the expansion region 254 can consume some or all of the amount of 1.0 meter (as determined above). Therefore, the vehicle 230 can expand the initial region 232 to include the expansion region 254 of 1.0 meter. As discussed above, in some instances, the vehicle can use an expansion threshold width to determine the expansion region 254.

By allowing the vehicle 230 to expand the initial region 232 by the expansion region 254, the vehicle 230 can determine that if the vehicle 230 traverses along a trajectory that uses expansion region 254, objects using the traffic lane 238 can similarly expand an initial region associated with the objects into the parking lane 240.

In some instances, the amount can be cumulative. For example, the vehicle 230 can determine that a width associated with the first candidate region 244 is 2.7 meters and a width associated with the second candidate region 246 is 3.0 meters. Additionally, the vehicle can determine a first candidate threshold width associated with the first candidate region 244 that is 2.5 meters and a second candidate threshold width associated with the second candidate region 246 that is 2.5 meters. Then the vehicle can determine a first amount that remains beyond the first candidate threshold width within the first candidate region 244. In this example, the first candidate region 244 is associated with a width of 2.7 meters and the first candidate threshold width can be 2.5 which results in an amount of 0.2 meters. Therefore, in such a circumstance, the vehicle 230 could expand the initial region 232 into the first candidate region 244 by 0.2 meters. Additionally, the vehicle 230 can determine a second amount that remains beyond the second candidate threshold width within the second candidate region 246. In this example, the second candidate region 246 is associated with a width of 3.0 meters and the second candidate threshold width can be 2.5 meters, which results in an amount of 0.5 meters. Therefore, a cumulative amount of 0.7 meters remains.

Of course, the numerical widths and thresholds are merely examples and other widths and/or threshold amounts are contemplated herein.

Figure 3:
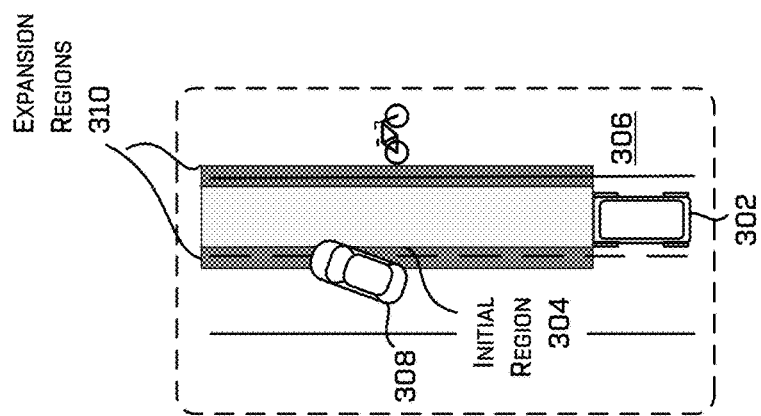
FIG. 3 depicts an example of determining an expansion region that is associated with a bicycle lane.
Figure 3:
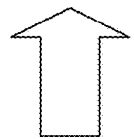
Figure 3:
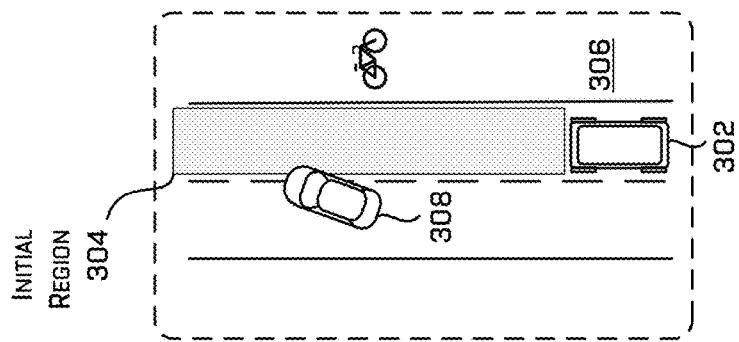

FIG. 3 depicts an example 300 of determining an expansion region that is associated with a bicycle lane. For example, vehicle 302 can determine an initial region 304 and a bicycle lane 306. In some instances, the vehicle 302 can determine the initial region 304 and the bicycle lane 306 using sensor data and/or map data. Additionally, the vehicle 302 can detect an object 308 that affects a portion of the initial region 304. The vehicle 302 can, using the techniques described herein, determine expansion regions 310 and expand the initial region 304 into the expansion regions 310. As the vehicle 302 approaches the object 308, the vehicle 302 can use the expansion regions 310 to determine a drivable region (e.g., the initial region 304 combined with the expansion region 310 with a portion of the drivable region deformed by the object 308) to circumvent the object 308 while continuing to allow, for example, bicyclists to safely occupy and use the bicycle lane 306.

As discussed above, in some examples, the drivable region can include information about object(s) detected in the environment and probabilistic distances between object(s) and a trajectory of the vehicle 302. For example, the drivable region can include a buffer associated with a boundary based at least in part on a distance (e.g., half of a width of a vehicle) plus some distance based on an uncertainty of sensor noise, which may be based at least in part on an object classification.

Further, and in some examples, a collision region can represent a buffer within the drivable region to further reduce a likelihood that the autonomous vehicle will collide with an object in the environment. In some examples, a cost associated with entering the collision region can be relatively high.

In some examples, a safety region can represent a region that further reduces the drivable region to provide a buffer between the autonomous vehicle and the object in the environment. In some examples, a cost associated with entering the safety region can be lower than a cost associated with the collision region.

In some examples, the collision region and/or the safety region can also be associated with information about object(s) in the environment and probabilistic distances between the boundaries and the object(s). In some examples, the autonomous vehicle can evaluate costs based at least in part on distance(s) between points on a reference trajectory and/or a target trajectory and one or more points associated with the regions, as discussed herein. In some examples, the cost(s) associated with the region(s) may vary. For example, a cost and/or weight associated with the safety region may be relatively less than a cost and/or weight associated with the collision region.

In some examples, a size of the region(s) can be based at least in part on a classification type of objects that the regions represent or are otherwise associated with in the environment. For example, a safety region associated with a pedestrian may be associated with a first distance or size and a safety region associated with a bicyclist can be associated with a second distance or size that is different than the first distance or size. In some instances, the autonomous vehicle can detect a group of bicyclists and determine a safety region associated with the group of bicyclists with a third distance or size that is different than the second distance or size. By way of example, and without limitation, a safety region associated with the pedestrian can be larger than a safety region associated with a bicyclist which can be larger than a safety region associated with a vehicle, which may result in the autonomous vehicle giving a larger buffer to the pedestrian than to the vehicle, assuming other factors are the same.

Figure 4:
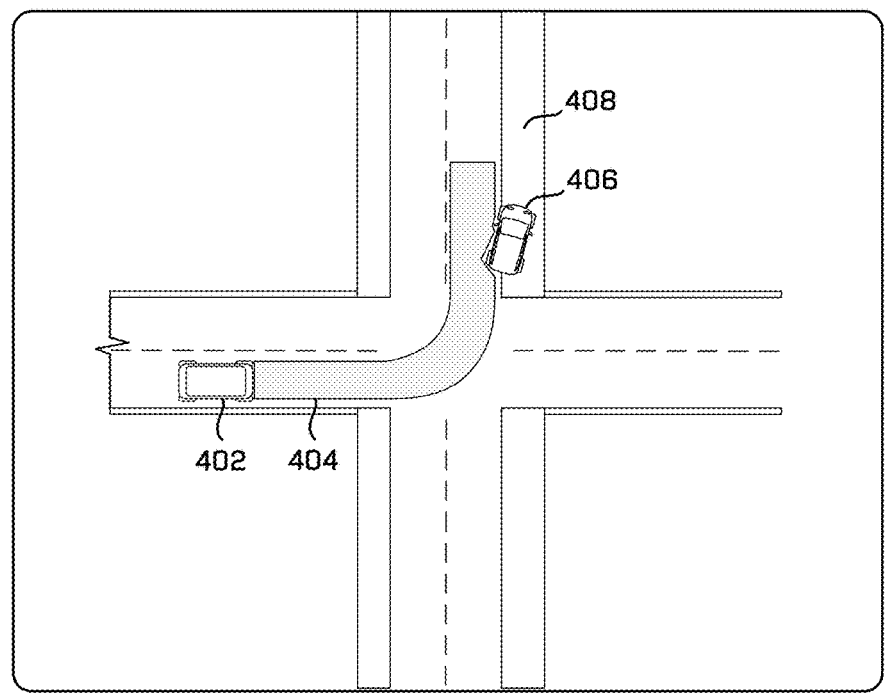
FIG. 4 depicts an example of determining an expansion region at an intersection.
Figure 4:
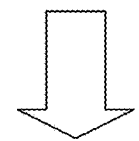
Figure 4:
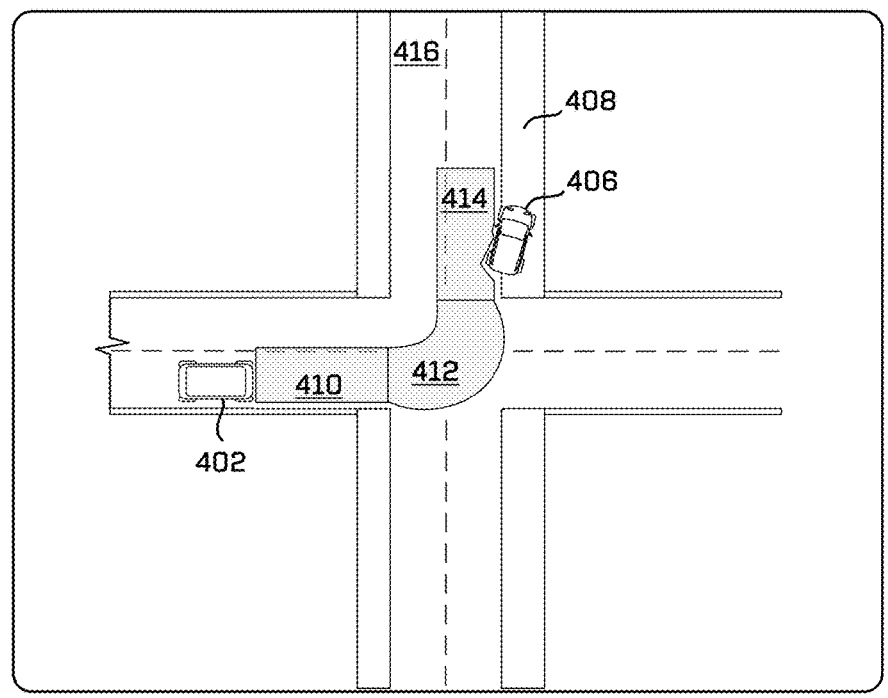

FIG. 4 depicts an example 400 of determining an drivable region that is associated with a driving lane while the vehicle performs a left turn action. For example, vehicle 402 can determine an initial region 404 that is associated with a trajectory that includes a left turn action in an intersection. As discussed above, the vehicle 402 can determine the initial region 404 using sensor data and/or map data. Additionally, the vehicle 402 can detect an object 406. As shown in FIG. 4, object 406 can be a vehicle that is parked in a parking lane 408. Using the techniques described herein, the vehicle 402 can determine a drivable region 410 associated with a first portion of the left turn action. The vehicle 402 can determine the drivable region 410 by determining a candidate region to the left of the vehicle, determining an expansion region, and associating the expansion region with the initial region to determine an expanded region. By way of example and without limitation, the vehicle 402 would not determine a candidate region to the right of the vehicle as there are no drivable regions available to the right of the vehicle a depicted in FIG. 4. For example, a curb can act as a barrier to the right of the vehicle 402. The drivable region 412 can be a middle portion of the left turn action that can allow the vehicle 402 to perform a narrower angle or a wider angle turn. The drivable region 414 can be a drivable region that is partially deformed due to the object 406 interfering with an extent of the drivable region 414. As the vehicle 402 completes the left turn action, the vehicle 402 can use the drivable region 414 to circumvent the object 406 while continuing to allow, for example, vehicles to safely occupy the driving lane 416.

Figure 5:
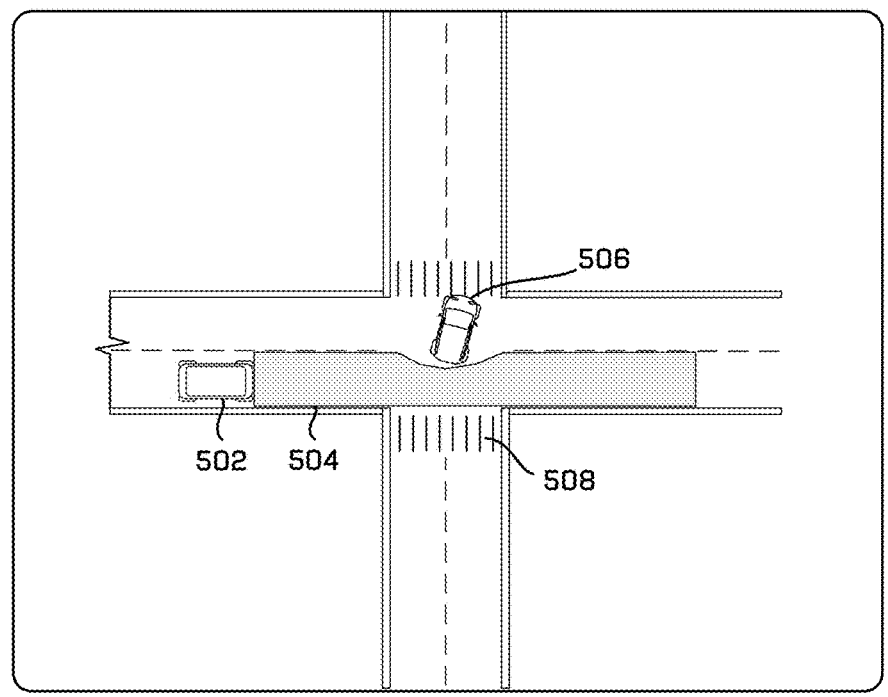
FIG. 5 depicts an example of determining an expansion region that is associated with a crosswalk.
Figure 5:
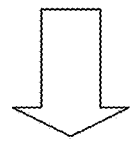
Figure 5:
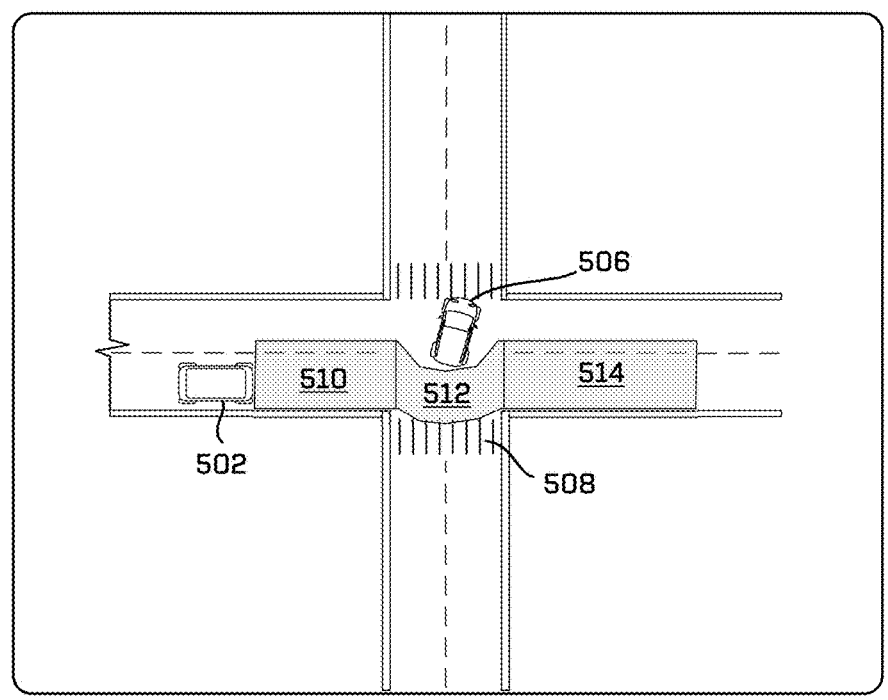

FIG. 5 depicts an example 500 of determining an drivable region that is associated with a crosswalk. For example, a vehicle 502 can determine an initial region 504 that is associated with a trajectory. As discussed above, the vehicle 502 can determine the initial region 504 using sensor data and/or map data. Additionally, the vehicle 502 can detect an object 506. As shown in FIG. 5, object 506 can be a vehicle that is stalled or a stationary vehicle in a traffic intersection, for example. Additionally, the vehicle 502 can determine a crosswalk 508 using, for example, the sensor data and/or the map data. Using the techniques described herein, the vehicle 502 can determine a drivable region 510 that is associated with a first portion of circumventing the object 506. The vehicle 502 can determine the drivable region 510 by determining a candidate region to the left of the vehicle, determining an expansion region, and associating the expansion region with the initial region to determine an expanded region. By way of example and without limitation, the vehicle 502 would not determine a candidate region to the right of the vehicle as there are no drivable regions available to the right of the vehicle a depicted in FIG. 5. For example, a curb can act as a barrier to the right of the vehicle 502. As the vehicle 502 approaches the object 506, the vehicle 502 can use the drivable region 512 to circumvent the object 506 while continuing to allow, for example, pedestrians to safely occupy the crosswalk 508. After circumventing the object 506, the vehicle 502 can continue traversing the environment using the drivable region 514.

In some examples, classification information associated with the crosswalk 508 (or any region) can indicate that such an expansion is not permitted, in which case, the vehicle 502 would not determine an expanded drivable region 510 using a portion of the crosswalk 508. As discussed above, the vehicle 502 can determine a collision region and/or a safety region associated with the drivable regions to reduce a likelihood that the vehicle 502 will collide with an object in the environment. In some instances, the vehicle 502 can be configured to not include a crosswalk as a candidate region if occupied by a pedestrian and/or other objects.

Figure 6:
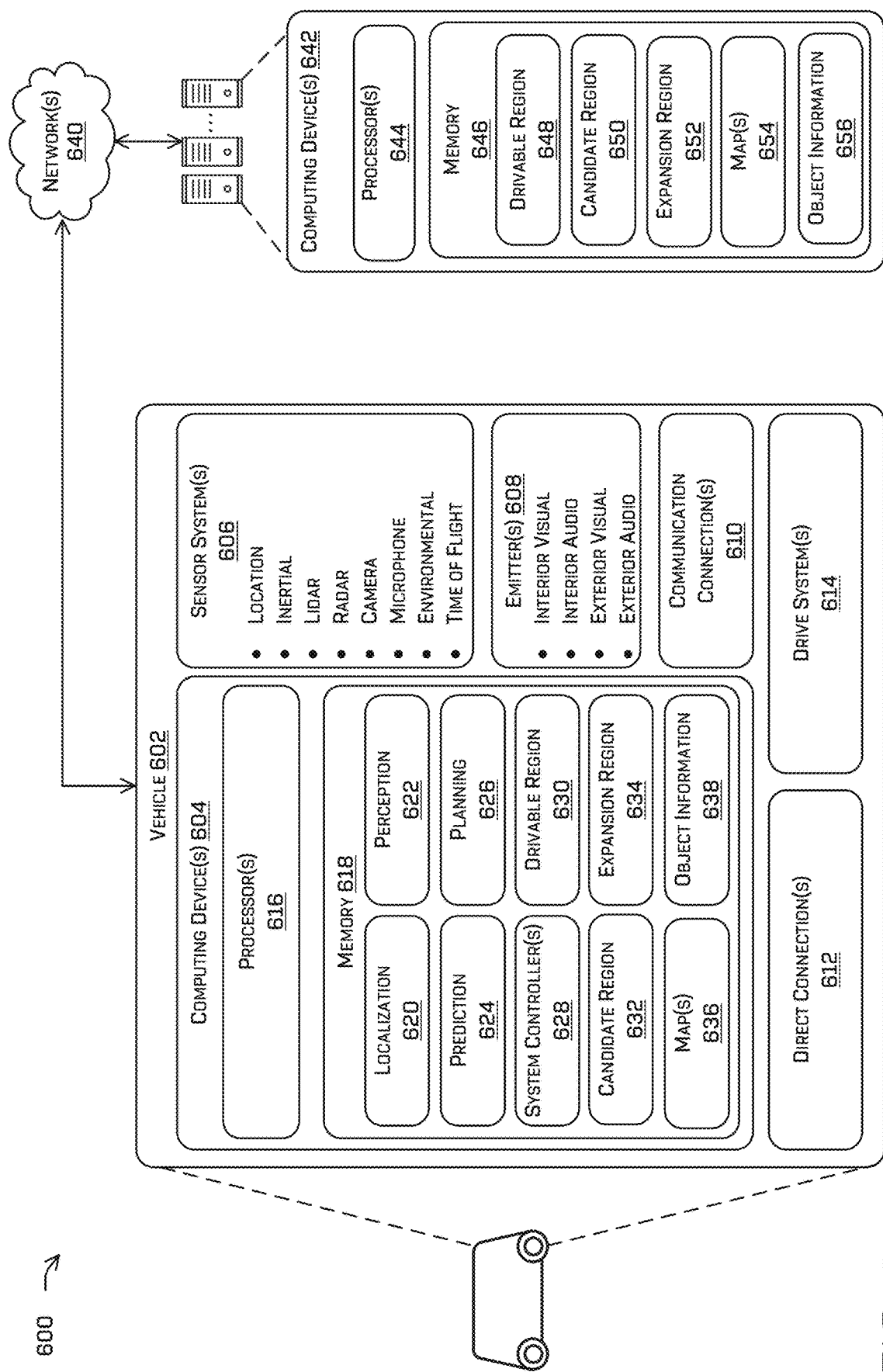
FIG. 6 depicts a block diagram illustrating an example computing system for determining an expansion region and an expanded drivable region, as described herein.

FIG. 6 is a block diagram illustrating an example system 600 for generating and utilizing an expanded drivable region as described herein. In at least one example, system 600 can include a vehicle 602, which can be the same or similar to vehicles 104, 204, 230, 302, 402, and 502 described above with reference to FIGS. 1-5, respectively.

The vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein can be incorporated into any ground-borne, airborne, or water-borne vehicle, including those ranging from vehicles that need to be manually controlled by a driver at all times, to those that are partially or fully autonomously controlled.

The vehicle 602 can be any configuration of vehicle, such as, for example, a van, a sport utility vehicle, a cross-over vehicle, a truck, a bus, an agricultural vehicle, and/or a construction vehicle. The vehicle 602 can be powered by one or more internal combustion engines, one or more electric motors, hydrogen power, any combination thereof, and/or any other suitable power sources. Although the vehicle 602 has four wheels, the systems and methods described herein can be incorporated into vehicles having fewer or a greater number of wheels, and/or tires. The vehicle 602 can have four-wheel steering and can operate generally with equal or similar performance characteristics in all directions, for example, such that a first end of the vehicle 602 is the front end of the vehicle 602 when traveling in a first direction, and such that the first end becomes the rear end of the vehicle 602 when traveling in the opposite direction. Similarly, a second end of the vehicle 602 is the front end of the vehicle when traveling in the second direction, and such that the second end becomes the rear end of the vehicle 602 when traveling in the opposite direction. These example characteristics can facilitate greater maneuverability, for example, in small spaces or crowded environments, such as parking lots and/or urban areas.

The vehicle 602 can include computing device(s) 604, sensor system(s) 606, emitter(s) 608, communication connection(s) 610, direct connection(s) 612, and drive system(s) 614.

The vehicle computing device(s) 604 can include processor(s) 616 and memory 618 communicatively coupled with processor(s) 616. In the illustrated example, vehicle 602 can be an autonomous vehicle. However, vehicle 602 could be any other type of vehicle. In the illustrated example, memory 618 of vehicle computing device(s) 604 can store a localization system 620, a perception system 622, a prediction system 624, a planning system 626, system controller(s) 628, a drivable region system 630, a candidate region system 632, an expansion region system 634, a map(s) system 636, and an object information system 638. Although these systems and components are illustrated, and described below, as separate components for ease of understanding, functionality of the various systems and controllers can be attributed differently than discussed. By way of example and without limitation, functionality attributed to perception system 622 can be carried out by localization system 620 and/or prediction system 624. Moreover, fewer or more systems and components can be used to perform the various functionalities described herein. Furthermore, though depicted in FIG. 6 as residing in memory 618 for illustrative purposes, it is contemplated that localization system 620, perception system 622, prediction system 624, planning system 626, system controller(s) system 628, drivable region system 630, candidate region system 632, expansion region system 634, map(s) system 636, and/or object information system 638 can additionally, or alternatively, be accessible to vehicle 602 (e.g., stored on, or otherwise accessible by, memory remote from vehicle 602).

In at least one example, localization system 620 can include functionality to receive data from sensor system(s) 606 to determine a position and/or orientation of vehicle 602 (e.g., one or more of an x-, y-, z-position, roll, pitch, or yaw). For example, localization system 620 can include and/or request/receive a map of an environment (e.g., from map(s) system 636) and can continuously determine a location and/or orientation of the autonomous vehicle within the map. In some instances, localization system 620 can use SLAM (simultaneous localization and mapping), CLAMS (calibration, localization and mapping, simultaneously), relative SLAM, bundle adjustment, non-linear least squares optimization, differential dynamic programming, or the like to receive image data, LIDAR data, RADAR data, IMU data, GPS data, wheel encoder data, and the like to accurately determine a location of the autonomous vehicle. In some instances, localization system 620 can provide data to various components of vehicle 602 to determine an initial position of an autonomous vehicle for generating a trajectory for travelling in the environment.

In some instances, perception system 622 can include functionality to perform object detection, segmentation, and/or classification. In some examples, perception system 622 can provide processed sensor data that indicates a presence of an object that is proximate to vehicle 602, such as objects 126, 208, 234, 308, 406, and/or 506. The perception system can also include a classification of the entity as an entity type (e.g., car, pedestrian, cyclist, animal, building, tree, road surface, curb, sidewalk, unknown, etc.). For instance, perception system 622 can compare sensor data to object information in object information system 638 to determine the classification. In additional and/or alternative examples, perception system 622 can provide processed sensor data that indicates one or more characteristics associated with a detected object and/or the environment in which the object is positioned. In some examples, characteristics associated with an object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), a bounding box associated with the object, etc. Characteristics associated with the environment can include, but are not limited to, a presence of another object in the environment, a state of another object in the environment, a time of day, a day of a week, a season, a weather condition, an indication of darkness/light, etc.

Prediction system 624 can access sensor data from sensor system(s) 606, map data from map system 636, and, in some examples, perception data output from perception system 622 (e.g., processed sensor data). In at least one example, prediction system 624 can determine features associated with the object based at least in part on the sensor data, the map data, and/or the perception data. As described above, features can include an extent of an object (e.g., height, weight, length, etc.), a pose of an object (e.g., x-coordinate, y-coordinate, z-coordinate, pitch, roll, yaw), a velocity of an object, an acceleration of an object, and a direction of travel of an object (e.g., a heading). Moreover, prediction system

624 can be configured to determine a distance between an object and a proximate driving lane, a width of a current driving lane, proximity to a crosswalk, semantic feature(s), interactive feature(s), etc.

Prediction system 624 can analyze features of objects to predict future actions of the objects. For instance, prediction system 624 can predict lane changes, decelerations, accelerations, turns, changes of direction, or the like. Examples of techniques for determining features of objects can be found, for example, in U.S. patent application Ser. No. 15/982,658 titled "Vehicle Lighting State Determination" and filed May 17, 2018 (describing, in part, determining a state of an object such as a parked vehicle, a double-parked vehicle, and/or a slow moving vehicle), which is hereby incorporated by reference, in its entirety. The prediction system 624 can send prediction data to drivable region system 630 so that drivable region system 630 can use the prediction data to determine the boundaries of the drivable region (e.g., based on one or more of an uncertainty in position, velocity, acceleration in addition to, or alternatively, with a semantic classification of the object). For instance, if the prediction data indicates that a pedestrian walking along the shoulder is behaving erratically, drivable region system 630 can determine an increased offset of the drivable region proximate the pedestrian. In some examples where vehicle 602 is not autonomous, prediction system 624 can provide an indication (e.g., an audio and/or visual alert) to a driver of a predicted event that can affect travel.

In some examples, prediction system 624 can include functionality to determine predicted point(s) representing predicted location(s) of an object in the environment. Prediction system 624, in some implementations, can determine a predicted point associated with a heat map based at least in part on a cell associated with a highest probability and/or based at least in part on cost(s) associated with generating a predicted trajectory associated with the predicted point.

For example, prediction system 624 can select a point, cell, or region of a heat map as a predicted point based at least in part on evaluating one or more cost functions associated with risk factors, safety, and vehicle dynamics, just to name a few examples. Such costs can include, but are not limited to, a positional-based cost (e.g., limiting the distance allowed between predicted points), a velocity cost (e.g., a constant velocity cost enforcing a constant velocity through the predicted trajectory), an acceleration cost (e.g., enforcing acceleration bounds throughout the predicted trajectory), an expectation that the object can follow rules of the road, and the like. In at least some examples, the probability associated with the cell can be multiplied with the cost (which, in at least some examples, can be normalized) such that the point (e.g., a candidate point) associated with the highest value of the cost times probability is selected as the predicted point associated with an object at a particular time.

In general, planning system 626 can determine a path for vehicle 602 to follow to traverse through an environment. For example, planning system 626 can determine various routes and trajectories and various levels of detail. For example, planning system 626 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, planning system 626 can generate an instruction for guiding the autonomous vehicle along at least a portion of the route from the first location to the second location. In at least one example, planning system 626 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for vehicle 602 to navigate. Thus, in example implementations described herein, planning system 626 can generate trajectories along which the vehicle can navigate, with the trajectories being contained within the drivable region.

The system controller(s) 628, which can be configured to control steering, propulsion, braking, safety, emitters, communication, and other systems of vehicle 602. These system controller(s) 628 can communicate with and/or control corresponding systems of drive system(s) 614 and/or other components of vehicle 602. For example, system controllers 628 can cause the vehicle to traverse along a drive path determined by planning system 626, e.g., in a drivable region determined by the drivable region system 630.

The drivable region system 630 can be configured to determine an initial drivable region, such as initial drivable regions 106, 206, 232, 304, 404, and 504. In some instances, the drivable region system 630 can use the sensor data and/or the map data to determine surfaces and identify surfaces that drivable (e.g., road surfaces such as driving lanes, parking lanes, bicycle lanes, crosswalk regions, and the like) while excluding non-drivable surfaces (e.g., sidewalks, medians, and the like). For example, the drivable region can represent an area of an environment that is free of obstacles and corresponds to regions where the vehicle 602 can traverse. In some instances, after determining an expanded drivable region, the drivable region system 630 can further determine updated drivable regions, such as drivable regions 124, 410, 412, 414, 510, 512, and 514 that are based on the expanded drivable regions. Although illustrated as a separate block in memory 618, in some examples and implementations, the drivable region system 630 can be a part of the planning system 626. Drivable region system 630 can access sensor data from sensor system(s) 606, map data from map system 636, object information from object information system 638, outputs from one or more of the localization system 620, the perception system 622, and/or the prediction system 624 (e.g., processed data).

By way of non-limiting example, drivable region system 630 can access (e.g., retrieve or receive) one or more planned paths. The planned paths can represent potential paths to navigate the environment, and can be determined based on map data, object information, and/or perception data, for example. In some examples, the planned paths can be determined as candidate paths for carrying out a mission. For instance, computing device(s) 604, can define or determine a mission as a highest-level of navigation to a destination, e.g., a series of roads for navigating to the destination. Once the mission is determined, one or more actions for carrying out that high-level navigation can then be determined. Actions can include more frequent determinations of how to carry out the mission. For example, actions can include tasks such as "follow vehicle," "pass vehicle on the right," or the like. In some examples, the projected paths described herein can be determined for each action.

For the planned path(s), drivable region system 630 can determine, at discrete points along the planned path(s), lateral distances from the path to objects in the environment.

For example, the distances can be received as perception data generated by perception system 622, and/or can be determined using mathematical and/or computer vision models, such as ray casting techniques. Various lateral distances can then be adjusted to account for other factors. For example, it may be desirable to maintain a minimum distance between vehicle 602 and objects in the environment. In some implementations, information about the objects, including semantic classifications, can be used to determine those distance adjustments.

Moreover, prediction system 624 can also provide prediction data about a predicted movement of the objects, and the distances can further be adjusted based on those predictions. For example, the prediction data can include a confidence score and the lateral distance can be adjusted based on the confidence score, e.g., by making a greater adjustment for less confident predictions and slighter or no adjustments for more confident predictions. Using the adjusted distances, drivable region system 630 can define boundaries of the drivable region. In at least some examples, the boundaries can be discretized (e.g., every 10 cm, 50 cm, 1 m, etc.) and information regarding the boundary can be encoded (e.g., lateral distance to the nearest object, semantic classification of the nearest object, confidence and/or probability score associated with the boundary, etc.). As described herein, the trajectory determined by planning system 626 can be confined by, and in accordance with, in the drivable region. While drivable region system 630 is illustrated as being separate from planning system 626, one or more of the functionalities of drivable region system 630 can be carried out by planning system 626. In some embodiments, drivable region system 630 can be a part of planning system 626.

The candidate region system 632 can be configured to determine candidate regions, such as candidate regions 108, 110, 148, 216, 244, and 246. In some instances, the candidate region system 632 can be executed as the vehicle 602 continues operation. In some instances, the candidate region system 632 can be disabled upon a conclusion of a mission. In some instances, the candidate region system 632 can be configured to determine candidate regions within a threshold distance of the vehicle 602. By way of example and without limitation, the candidate region system 632 can be configured to determine candidate regions within a 200-meter threshold. In some instances, the threshold distance can be based on a perception threshold associated with the sensor system(s) 606. In some instances, using a threshold distance can reduce an amount of computational resources consumed by the candidate region system 632.

Although illustrated as a separate block in memory 618, in some examples and implementations, the candidate region system 632 can be a part of the planning system 626. The candidate region system 632 can access sensor data from sensor system(s) 606 and/or map data from map system 636. In some instances, the candidate region system 632 can, using the sensor data and/or the map data, determine candidate regions that can be adjacent to or near an initial region associated with a reference trajectory. For example, the candidate region system 632 can use the sensor data and/or the map data to determine surfaces and identify surfaces that drivable (e.g., road surfaces such as driving lanes, parking lanes, bicycle lanes, crosswalk regions, and the like) while excluding non-drivable surfaces (e.g., sidewalks, medians, and the like).

Additionally, the candidate region system 632 can determine a classification associated with a candidate region system. For example, the map data can indicate that a candidate region is associated with a parking lane and/or a bicycle lane and determine classifications associated with the candidate regions (e.g., a driving lane classification, a bicycle lane classification, and the like). After determining a classification associated with a candidate region, the candidate region system 632 can determine a candidate threshold width associated with the classification. By way of example, and without limitation, a candidate threshold width associated with a driving lane classification can be 2.5 meters and a candidate threshold width associated with a bicycle lane classification can be 1.5 meters. In some instances, the candidate threshold widths associated with the classifications can be predetermined and stored in the candidate region system 632.

The expansion region system 634 can be configured to determine an expansion region, such as expansion regions 118, 120, 156, 224, 254, and 310. Although illustrated as a separate block in memory 618, in some examples and implementations, the expansion region system 634 can be a part of the planning system 626. The expansion region system 634 can access sensor data from sensor system(s) 606 and, in some instances, the expansion region system 634 can, using the sensor data, determine expansion regions associated with the candidate regions determined by the candidate region system 632. For example, the expansion region system 634 can use the sensor data to determine objects that could be present in the candidate region. If the candidate region is clear of objects and/or obstructions (and/or if a probability associated with the candidate region being clear of objects and/or obstructions meets or exceeds a threshold probability), the expansion region system can determine an expansion region based on an amount that the width of the candidate region exceeds the candidate threshold width.

In an example, a candidate region can have a width of 3.0 meters and the candidate threshold width can be 2.5 meters. The expansion region system 634 can then expand a border of the drivable region by 0.5 meters into the candidate region. In some instances, the expansion region system 634 can determine the expansion region and transmit the expansion region data to the drivable region system 630 where the drivable region system 630 can determine an updated drivable region that incorporates the expansion region.

In some instances, the expansion region system 634 can determine an expansion threshold width. By way of example, the expansion threshold width can be 0.3 meters. Thus, in the example above, the expansion region system 634 can determine an expansion region of 0.3 meters of the available 0.5 meters.

In at least one example, the localization system 620, the perception system 622, the prediction system 624, the planning system 626, the drivable region system 630, the candidate region system 632, and/or the expansion region system 634 can process sensor data and/or map data, as described above, and can send their respective outputs over network(s) 640, to computing device(s) 642. In at least one example, the localization system 620, the perception system 622, the prediction system 624, the planning system 626, the drivable region system 630, the candidate region system 632, and/or the expansion region system 634 can send their respective outputs to computing device(s) 642 at a particular frequency, after a lapse of a predetermined period of time, in near real-time, etc.

As also illustrated in FIG. 6 and as discussed above, memory 618 can include a map system 636, which can store one or more maps, and/or object information system 638, which can store object information. A map can be any number of data structures modeled in two dimensions or three dimensions that can provide information about an environment, such as, but not limited to, topologies (such as intersections), streets, mountain ranges, roads, terrain, and the environment in general.

In at least one example, sensor system(s) 606 can include time-of-flight sensors, lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), etc. sensor system(s) 606 can include multiple instances of each of these or other types of sensors. For instance, the lidar sensors can include individual lidar sensors located at the corners, front, back, sides, and/or top of vehicle 602. As another example, the camera sensors can include multiple cameras disposed at various locations about the exterior and/or interior of vehicle 602. sensor system(s) 606 can provide input to computing device(s) 604. Additionally, and/or alternatively, sensor system(s) 606 can send sensor data, via network(s) 640, to computing device(s) 642 at a particular frequency, after a lapse of a predetermined period of time, in near real-time, etc.

The vehicle 602 can also include emitter(s) 608 for emitting light and/or sound. The emitter(s) 608 in this example include interior audio and visual emitters to communicate with passengers of vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, emitter(s) 608 can be disposed at various locations about the exterior and/or interior of vehicle 602.

The vehicle 602 can also include communication connection(s) 610 that enable communication between vehicle 602 and other local or remote computing device(s). For instance, communication connection(s) 610 can facilitate communication with other local computing device(s) on vehicle 602 and/or drive system(s) 614. Also, communication connection(s) 610 can allow the vehicle to communicate with other nearby computing device(s) (e.g., other nearby vehicles, traffic signals, etc.). The communications connection(s) 610 also enable vehicle 602 to communicate with a remote tele-operations computing device or other remote services.

The communications connection(s) 610 can include physical and/or logical interfaces for connecting vehicle computing device(s) 604 to another computing device or a network, such as network(s) 640. For example, communications connection(s) 610 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

In at least one example, vehicle 602 can include drive system(s) 614. In some examples, vehicle 602 can have a single drive system 614. In at least one example, if vehicle 602 has multiple drive systems 614, individual drive systems 614 can be positioned on opposite ends of vehicle 602 (e.g., the front and the rear, etc.). In at least one example, drive system(s) 614 can include sensor system(s) to detect conditions of drive system(s) 614 and/or surroundings of vehicle 602. By way of example and not limitation, sensor system(s) 606 can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, time-of-flight sensors, etc. Some sensors, such as the wheel encoder(s) can be unique to drive system(s) 614. In some cases, the sensor system(s) 606 on drive system(s) 614 can overlap or supplement corresponding systems of vehicle 602 (e.g., sensor system(s) 606).

The drive system(s) 614 can include many of the vehicle systems, including a high voltage battery, a motor to propel vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, drive system(s) 614 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of drive system(s) 614. Furthermore, drive system(s) 614 also include communication connection(s) that enable communication by the respective drive module with other local or remote computing device(s).

As described above, vehicle 602 can send sensor data to computing device(s) 642 via network(s) 640. In some examples, vehicle 602 can send raw sensor data to computing device(s) 642. In other examples, vehicle 602 can send processed sensor data and/or representations of sensor data to computing device(s) 642 (e.g., data output from localization system 620, perception system 622, prediction system 624, and/or planning system 626). In some examples, vehicle 602 can send sensor data to computing device(s) 642 at a particular frequency after a lapse of a predetermined period of time, in near real-time, etc.

Computing device(s) 642 can receive sensor data (raw or processed) from vehicle 602 and/or one or more other vehicles and/or data collection devices and can determine an expanded drivable region based on the sensor data and other information. In at least one example, computing device(s) 642 can include processor(s) 644 and memory 646 communicatively coupled with processor(s) 644. In the illustrated example, memory 646 of computing device(s) 642 stores a drivable region system 648, a candidate region system 650, an expansion region system 652, a map(s) system 654, and an object information system 656, for example. In at least one example, map(s) system 654 can correspond to the map(s) system 636 and the object information system 656 can correspond to the object information system 638.

The drivable region system 648 can correspond to drivable region system 630, the candidate region system 650 can correspond to the candidate region system 632, and the expansion region system 652 can correspond to the expansion region system 634, described above. For example, drivable region system 648 can process data to determine a drivable region remote from the vehicle 602. For example, the drivable region (or a preferred drivable region from a plurality of drivable region) can be determined at computing device(s) 642 and transferred back to vehicle 602, e.g., via networks 640. Moreover, the drivable region system 648 can perform one or more operations as described above and ascribed to localization system 620, perception system 622, prediction system 624, and/or planning system 626.

In at least one example, the drivable region system 648 can analyze the sensor data to determine attributes of objects in the environment to (1) determine whether such object(s) should be included in a drivable region and (2) configure boundaries of the drivable region. For example, drivable region system 648 can compare information about objects to classification information, e.g., stored in object information system 656, to determine whether the object will be affected by the vehicle, whether the object (or a predicted movement of the object) will affect the vehicle, and/or the extent to which the object should affect an extent of the drivable region.

The drivable region system 648 can also or alternatively consider features of objects to characterize the drivable region. Features can include an extent of an object (e.g., height, weight, length, etc.), a pose of an object (e.g., x-coordinate, y-coordinate, z-coordinate, pitch, roll, yaw), a velocity of an object, an acceleration of an object, a direction of travel of an object (e.g., a heading), a distance between an object and a proximate driving lane, a semantic classification of the object (car, pedestrian, bicyclist, etc.), a width of a current driving lane, proximity to a crosswalk, semantic feature(s), interactive feature(s), etc. In some examples, at least some of the features (e.g., the extent, the pose, etc.) can be determined by a perception system onboard a sensor data source (e.g., vehicle 602 and/or the other vehicle(s) and/or data collection device(s)) and other of the features can be determined based on such features and/or other sensor data and/or map data associated with a map of the environment. In some examples, a sample can be broken into one or more shorter periods of time and features can be determined for each of the shorter periods of time. The features for the sample can be determined based on a totality of features from each of the shorter periods of time.

Similarly, the candidate region system 650 can correspond to the candidate region system 632 and the expansion region system 652 can correspond to the expansion region system 634. As discussed above, systems and components of the computing device(s) 604 can, in some instances, be performed remotely in computing device(s) 642 and transmit and/or receive data output by the various systems and components of the computing device(s) 604 and 642 across network(s) 640.

Processor(s) 616 of vehicle 602 and processor(s) 644 of computing device(s) 642 can be any suitable processor capable of executing instructions to process data and perform operations as described herein. By way of example and not limitation, processor(s) 616 and 644 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 646 are examples of non-transitory computer-readable media. The memories 618 and 646 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of vehicle 602 can be associated with computing device(s) 642 and/or components of computing device(s) 642 can be associated with vehicle 602. That is, vehicle 602 can perform one or more of the functions associated with computing device(s) 642, and vice versa. Moreover, although various systems and components are illustrated as being discrete systems, the illustrations are examples only, and more or fewer discrete systems can perform the various functions described herein.

In some instances, aspects of some or all of the components discussed herein can include any models, algorithms, and/or machine learning algorithms. For example, in some instances, the components in the memory 618 and 646 can be implemented as a neural network.

Figure 7:
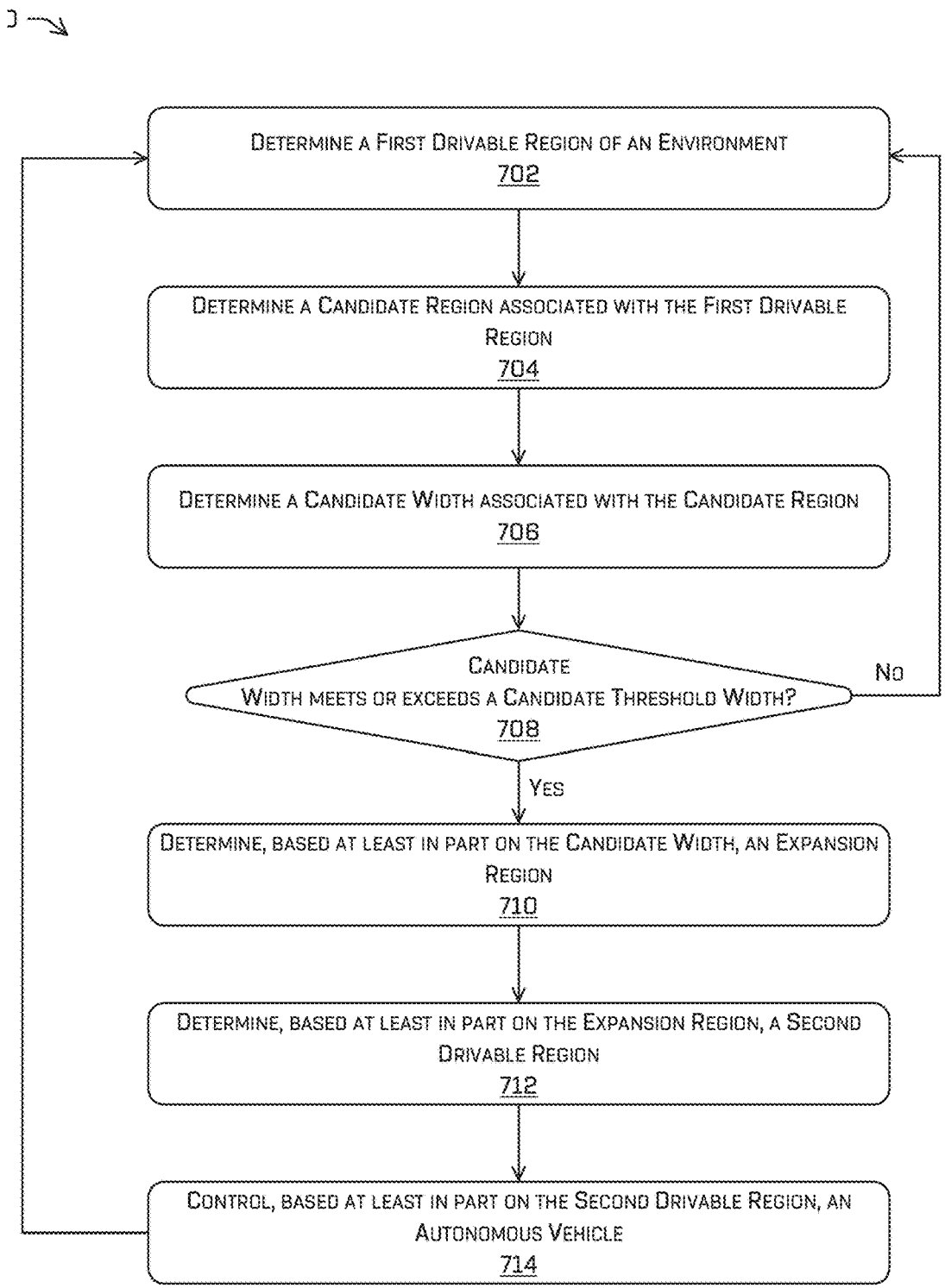
FIG. 7 depicts an example process for determining an expanded drivable region and controlling an autonomous vehicle.

FIG. 7 depicts an example process 700 for determining the second drivable region and controlling an autonomous vehicle based at least in part on the second drivable region.

At operation 702, a computing device can determine a first drivable region of an environment. The computing system can use data such as sensor data of an environment and/or map data of an environment to determine the first drivable region of the environment. For example, the drivable region can represent a region in the environment that can define the constraints and/or boundaries within which a vehicle can safely travel relative to the objects to effectively reach an intended destination.

At operation 704, the computing device can determine a candidate region associated with the first drivable region. In some instances, the computing device can use the sensor data and/or the map data to determine the candidate region. In some instances, the candidate region can be associated with the first drivable region based on a proximity of the candidate region to the first drivable region.

At operation 706, the computing device can determine a candidate width associated with the candidate region. In some instances, the computing device can use sensor data and/or map data to determine the candidate width. Using the map data that is associated with the environment, the computing device can determine the width of, for example, an adjacent lane.

At operation 708, the computing device can determine if the candidate width meets or exceeds a candidate threshold width. As described above, the computing system, in some instances, can determine a classification and/or region type associated with the candidate region. The classification can determine the candidate threshold width. For example, a bicycle lane can be associated with a candidate threshold width that is narrower than a bus lane. The candidate threshold width can indicate a width that allows an object associated with the candidate region to safely use and/or occupy the candidate region while the vehicle uses the expanded drivable region (e.g., the second drivable region).

If the candidate width does not meet or exceed the candidate threshold width, the example process 700 can return to operation 702. If the candidate width threshold does meet or exceed the candidate threshold width, the example process 700 can proceed to operation 710.

At operation 710, the computing system can determine an expansion width based at least in part on the candidate width. By way of example and without limitation, a candidate region can be associated with a width of 3.0 meters and be associated with a candidate threshold width of 2.5 meters based on a classification associated with "vehicles." The available amount for driving can be 0.5 meters and the expansion width can include the available amount of 0.5 meters. In some instances, the computing device can determine an expansion threshold width to determine the expansion width. By way of example and without limitation, an expansion threshold width of 0.3 meters would limit the available amount of 0.5 meters to 0.3 meters.

At operation 712, the computing device can determine a second drivable region based at least in part on the expansion width. As described above, the expansion width can include the available amount of width associated with the candidate region or a portion of the available amount of width associated with the candidate region. The computing system can determine the second drivable region by expanding the first drivable region to include the expansion width.

At operation 714, the computing device of an autonomous vehicle can control the autonomous vehicle based at least in part on the second drivable region. As discussed above, the autonomous vehicle can use the second drivable region (or the expanded drivable region) to circumvent objects that can interfere with a trajectory of the autonomous vehicle.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE CLAUSES

A: A system comprising: one or more processors; and one or more computer-readable media storing computer-executable instructions that, when executed, cause the one or more processors to perform operations comprising: receiving sensor data from a sensor on an autonomous vehicle traversing an environment; receiving map data associated with the environment; determining, based at least in part on the the map data, an initial drivable region of the environment; determining, based at least in part on the sensor data or the map data, a candidate drivable region adjacent to the initial drivable region; determining a classification associated with the candidate drivable region; determining a width associated with the candidate drivable region; determining, based at least in part on the classification, a threshold width; determining that the width exceeds the threshold width; determining an expansion region adjacent to the initial drivable region; determining, based at least in part on the expansion region and the initial drivable region, an expanded drivable region; and controlling, based at least in part on the expanded drivable region, the autonomous vehicle.

B: The system of paragraph A, the operations further comprising: determining, based at least in part on the sensor data, an object in the environment; and determining that the object is associated with the initial drivable region.

C: The system of paragraph B, wherein a first width associated with the initial drivable region at a location that is associated with the object is less than a second width associated with the expanded drivable region at the location.

D: The system of paragraph A, wherein the classification comprises at least one of: a traffic lane; a bus lane; a motorcycle lane; a shoulder; a bicycle lane; or a parking lane.

E: The system of paragraph A, wherein determining the expanded drivable region comprises: determining a cost associated with a portion of the expanded drivable region; and determining, based at least in part on the cost, a trajectory; wherein controlling the autonomous vehicle is further based at least in part on the trajectory.

F: A method comprising: receiving sensor data associated with an environment; receiving map data associated with the environment; determining, based at least in part on the sensor data or the map data, a first drivable region of the environment; determining, based at least in part on the sensor data or the map data, a candidate region associated with the first drivable region; determining that a candidate width associated with the candidate region meets or exceeds a candidate threshold width; determining, based at least in part on determining the candidate width meets or exceeds the candidate threshold width, an expansion region; determining, based at least in part on the expansion region and the first drivable region, a second drivable region; and controlling, based at least in part on the second drivable region, a vehicle.

G: The method of paragraph F, further comprising: determining an expansion threshold width based at least in part on a classification associated with the candidate region; and determining that an expansion width associated with the expansion region is less than or equal to the expansion threshold width; wherein determining the second drivable region is based at least in part on determining that the expansion width is less than or equal to the expansion threshold width.

H: The method of paragraph G, further comprising: determining a first direction of travel associated with the first drivable region; and determining a second direction of travel associated with the candidate region; wherein determining the expansion threshold width is further based at least in part on determining that the first direction of travel is different from the second direction of travel.

I: The method of paragraph F, wherein the candidate region is associated with at least one of a driving lane, a parking lane, a bicycle lane, or a crosswalk.

J: The method of paragraph F, further comprising: determining, based at least in part on the sensor data, an object in the environment; determining that a first portion of the object is at least partially obstructing travel through the first drivable region; and determining a trajectory associated with the second drivable region that surpasses the object; wherein controlling the vehicle is further based at least in part on the trajectory.

K: The method of paragraph F, further comprising: determining a cost associated with a portion of the second drivable region; and determining, based at least in part on the cost, a trajectory; wherein controlling the vehicle is further based at least in part on the trajectory.

L: The method of paragraph F, further comprising: determining, based at least in part on the sensor data or the map data, a classification associated with the candidate region, the classification indicating at least one of a driving lane, a parking lane, a bicycle lane, or a crosswalk; and determining, based at least in part on the classification, the candidate threshold width.

M: The method of paragraph F, wherein the candidate region is a first candidate region and the candidate width is a first candidate width, the method further comprising: determining, based at least in part on the sensor data or the map data, a second candidate region; and determining, based at least in part on the sensor data or the map data, a second candidate width associated with the second candidate region; wherein determining the second drivable region is further based at least in part on the second candidate width.

N: A non-transitory computer-readable medium storing instructions executable by a processor, wherein the instructions, when executed, cause the processor to perform operations comprising: determining a first region of an environment through which a vehicle is travelling; determining a candidate region of the environment; determining that a candidate width associated with the candidate region meets or exceeds a candidate threshold width; determining, based at least in part on the first region, a second region comprising at least the first region and a portion of the candidate region; and controlling, based at least in part on the second region, the vehicle.

O: The non-transitory computer-readable medium of paragraph N, the operations further comprising: determining an expansion threshold width associated with the candidate region based at least in part on a classification associated with the candidate region; determining that an expansion width associated with the candidate region is less than or equal to the expansion threshold width; and determining, based at least in part on the expansion width, the portion of the candidate region; wherein determining the second region is based at least in part on determining that the expansion width is less than or equal to the expansion threshold width.

P: The non-transitory computer-readable medium of paragraph O, wherein the classification comprises at least one of a driving lane, a parking lane, a bicycle lane, or a crosswalk.

Q: The non-transitory computer-readable medium of paragraph N, the operations further comprising: receiving sensor data associated with the environment; determining, based at least in part on the sensor data, an object in the environment; determining that the object is at least partially obstructing the vehicle from traversing through the first region; and determining a trajectory associated with the second region that overcomes the object; wherein controlling the vehicle is further based at least in part on the trajectory.

R: The non-transitory computer-readable medium of paragraph N, wherein the portion is a first portion, the operations further comprising: determining a cost associated with a second portion of the second region; determining, based at least in part on the cost, a trajectory; and controlling, based at least in part on the trajectory, the vehicle.

S: The non-transitory computer-readable medium of paragraph N, wherein the candidate region is a first candidate region and the candidate width is a first candidate width, the operations further comprising: determining a second candidate region that is associated with the first candidate region; and determining a second candidate width associated with the second candidate region; wherein, determining the second region is further based at least in part on the second candidate width.

T: The non-transitory computer-readable medium of paragraph N, the operations further comprising: determining map data associated with the environment; wherein determining at least one of the first candidate width or the second candidate width is further based at least in part on the map data.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising:
one or more processors; and
one or more computer-readable media storing computer-executable instructions that, when executed, cause the one or more processors to perform operations comprising:
receiving sensor data from a sensor on an autonomous vehicle traversing an environment;

receiving map data associated with the environment;
determining, based at least in part on the map data, an initial drivable region of the environment;
determining, based at least in part on the sensor data or the map data, a candidate drivable region adjacent to the initial drivable region;
determining a classification representing the candidate drivable region;
determining a width associated with the candidate drivable region;
determining a threshold width associated with the classification representing the candidate drivable region;
determining that the width exceeds the threshold width;
determining an expansion region adjacent to the initial drivable region, wherein the expansion region is determined based at least in part on a difference between the threshold width and the width associated with the candidate drivable region;
determining, based at least in part on the expansion region and the initial drivable region, an expanded drivable region; and
controlling, based at least in part on the expanded drivable region, the autonomous vehicle.

2. The system of claim 1, the operations further comprising:
determining, based at least in part on the sensor data, an object in the environment; and
determining that the object is associated with the initial drivable region.

3. The system of claim 2, wherein a first width associated with the initial drivable region at a location that is associated with the object is less than a second width associated with the expanded drivable region at the location.

4. The system of claim 1, wherein the classification comprises at least one of:
a traffic lane;
a bus lane;
a motorcycle lane;
a shoulder;
a bicycle lane; or
a parking lane.

5. The system of claim 1, wherein determining the expanded drivable region comprises:
determining a cost associated with a portion of the expanded drivable region; and
determining, based at least in part on the cost, a trajectory;
wherein controlling the autonomous vehicle is further based at least in part on the trajectory.

6. A method comprising:
receiving sensor data associated with an environment;
receiving map data associated with the environment;
determining, based at least in part on the sensor data or the map data, a first drivable region of the environment;
determining, based at least in part on the sensor data or the map data, a candidate region associated with the first drivable region;
determining a candidate threshold width associated with a classification representing the candidate region;
determining that a candidate width associated with the candidate region meets or exceeds the candidate threshold width;
determining, based at least in part on determining the candidate width meets or exceeds the candidate threshold width, an expansion region, wherein the expansion region is determined based at least in part on a difference between the candidate threshold width and the candidate width associated with the candidate region;
determining, based at least in part on the expansion region and the first drivable region, a second drivable region; and
controlling, based at least in part on the second drivable region, a vehicle.

7. The method of claim 6, further comprising:
determining an expansion threshold width based at least in part on the classification representing the candidate region; and
determining that an expansion width associated with the expansion region is less than or equal to the expansion threshold width;
wherein determining the second drivable region is based at least in part on determining that the expansion width is less than or equal to the expansion threshold width.

8. The method of claim 6, wherein the candidate region is associated with at least one of a driving lane, a parking lane, a bicycle lane, or a crosswalk.

9. The method of claim 6, further comprising:
determining, based at least in part on the sensor data, an object in the environment;
determining that a first portion of the object is at least partially obstructing travel through the first drivable region; and
determining a trajectory associated with the second drivable region that surpasses the object;
wherein controlling the vehicle is further based at least in part on the trajectory.

10. The method of claim 6, further comprising:
determining a cost associated with a portion of the second drivable region; and
determining, based at least in part on the cost, a trajectory;
wherein controlling the vehicle is further based at least in part on the trajectory.

11. The method of claim 6, further comprising:
determining, based at least in part on the sensor data or the map data, the classification representing the candidate region, the classification indicating at least one of a driving lane, a parking lane, a bicycle lane, or a crosswalk; and
determining, based at least in part on the classification, the candidate threshold width.

12. The method of claim 6, wherein the candidate region is a first candidate region and the candidate width is a first candidate width, the method further comprising:
determining, based at least in part on the sensor data or the map data, a second candidate region; and
determining, based at least in part on the sensor data or the map data, a second candidate width associated with the second candidate region;
wherein determining the second drivable region is further based at least in part on the second candidate width.

13. One or more non-transitory computer-readable media storing instructions executable by one or more processors, wherein the instructions, when executed, cause the one or more processors to perform operations comprising:
determining a first region of an environment through which a vehicle is travelling;
determining a candidate region of the environment;
determining a candidate threshold width associated with a classification representing the candidate region;
determining that a candidate width associated with the candidate region meets or exceeds the candidate threshold width;
determining, based at least in part on the first region, a second region comprising at least the first region and a portion of the candidate region, wherein the portion of the candidate region is determined based at least in part on a difference between the candidate threshold width and the candidate width associated with the candidate region; and controlling, based at least in part on the second region, the vehicle.

14. The one or more non-transitory computer-readable media of claim 13, the operations further comprising:

determining an expansion threshold width associated with the candidate region based at least in part on the classification representing the candidate region;

determining that an expansion width associated with the candidate region is less than or equal to the expansion threshold width; and determining, based at least in part on the expansion width, the portion of the candidate region;

wherein determining the second region is based at least in part on determining that the expansion width is less than or equal to the expansion threshold width.

15. The one or more non-transitory computer-readable media of claim 13, wherein the classification comprises at least one of a driving lane, a parking lane, a bicycle lane, or a crosswalk.

16. The one or more non-transitory computer-readable media of claim 13, the operations further comprising:

receiving sensor data associated with the environment;

determining, based at least in part on the sensor data, an object in the environment;

determining that the object is at least partially obstructing the vehicle from traversing through the first region; and determining a trajectory associated with the second region that overcomes the object;

wherein controlling the vehicle is further based at least in part on the trajectory.

17. The one or more non-transitory computer-readable media of claim 13, wherein the portion is a first portion, the operations further comprising:

determining a cost associated with a second portion of the second region;

determining, based at least in part on the cost, a trajectory; and controlling, based at least in part on the trajectory, the vehicle.

18. The one or more non-transitory computer-readable media of claim 13, wherein the candidate region is a first candidate region and the candidate width is a first candidate width, the operations further comprising:

determining a second candidate region that is associated with the first candidate region; and determining a second candidate width associated with the second candidate region;

wherein, determining the second region is further based at least in part on the second candidate width.

19. The one or more non-transitory computer-readable media of claim 18, the operations further comprising:

determining map data associated with the environment;

wherein determining at least one of the first candidate width or the second candidate width is further based at least in part on the map data.

20. The one or more non-transitory computer-readable media of claim 13, wherein the candidate region is a first candidate region, wherein the classification is a first classification, wherein the candidate width is a first candidate width, wherein the candidate threshold width is a first candidate threshold width, wherein the portion of the candidate region is a first expansion region, where in the portion of the first candidate region is a first portion, wherein the operations further comprising:

determining a second candidate region of the environment;

determining a second candidate threshold width associated with a second classification representing the second candidate region;

determining that a second candidate width associated with the second candidate region meets or exceeds the second candidate threshold width; and wherein the second region comprises at least the first region, the first portion of the first candidate region, and a second portion of the second candidate region.

* * * * *